US008406021B2

(12) United States Patent
Green

(10) Patent No.: US 8,406,021 B2
(45) Date of Patent: Mar. 26, 2013

(54) SYSTEM AND METHOD FOR REDUCING LINE CURRENT DISTORTION

(75) Inventor: Charles E. Green, Fenton, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 411 days.

(21) Appl. No.: 12/852,578

(22) Filed: Aug. 9, 2010

(65) Prior Publication Data

US 2011/0031942 A1 Feb. 10, 2011

Related U.S. Application Data

(60) Provisional application No. 61/232,646, filed on Aug. 10, 2009.

(51) Int. Cl.
H02M 1/42 (2007.01)
H02M 7/23 (2006.01)

(52) U.S. Cl. ............. 363/89; 323/207; 363/70; 363/127

(58) Field of Classification Search .................. 323/207, 323/222, 282; 363/37, 70, 81, 84, 89, 127
See application file for complete search history.

(56) References Cited

U.S. PATENT DOCUMENTS

| 4,364,237 | A | 12/1982 | Cooper et al. |
| 4,370,564 | A | 1/1983 | Matsushita |
| 4,428,016 | A | 1/1984 | Brasfield |
| 4,662,185 | A | 5/1987 | Kobayashi et al. |
| 4,866,588 | A | 9/1989 | Rene |
| 4,940,929 | A | 7/1990 | Williams |
| 5,064,356 | A | 11/1991 | Horn |
| 5,224,025 | A | 6/1993 | Divan et al. |
| 5,320,506 | A | 6/1994 | Fogt |
| 5,359,281 | A | 10/1994 | Barrow et al. |
| 5,371,666 | A | 12/1994 | Miller |
| 5,383,109 | A | 1/1995 | Maksimovic et al. |
| 5,457,375 | A | 10/1995 | Marcinkiewicz et al. |

(Continued)

FOREIGN PATENT DOCUMENTS

| JP | 08249067 A | 9/1996 |
| JP | 09062363 A | 3/1997 |

(Continued)

OTHER PUBLICATIONS

Baggio, J.E., et al., "Discrete control for three-level boost PFC converter," Telecommunications Energy Conference, 2002. INTELEC. 24th Annual International, pp. 627-633, 2002. doi: 10.1109/INTLEC.2002.1048722 URL: http://ieeexplore.ieee.org/stamp/stamp.jsp?tp=&arnumber=1048722&isnumber=22440.*

(Continued)

Primary Examiner — Adolf Berhane
Assistant Examiner — Fred E Finch, III
(74) Attorney, Agent, or Firm — Harness, Dickey & Pierce, P.L.C.

(57) ABSTRACT

A power factor correction (PFC) system includes an adjustment module, a compensation module, and a duty cycle control module. The adjustment module generates N time advances based on N predetermined time advances and (N−1) time advance adjustments, wherein N is an integer greater than zero. The compensation module generates N compensated versions of an input alternating current (AC) line signal by predicting ahead of the input AC line signal using a gradient of a sinusoidal reference signal and the N time advances, respectively, wherein the sinusoidal reference signal is synchronized with the input AC line signal in phase and frequency. The duty cycle control module generates PFC duty cycles based on the N compensated versions of the input AC line signal.

20 Claims, 16 Drawing Sheets

U.S. PATENT DOCUMENTS

| | | | |
|---|---|---|---|
| 5,461,263 A | 10/1995 | Helfrich | |
| 5,483,136 A | 1/1996 | Marcinkiewicz | |
| 5,502,630 A | 3/1996 | Rokhvarg | |
| 5,565,752 A | 10/1996 | Jansen et al. | |
| 5,605,053 A | 2/1997 | Otori | |
| 5,656,915 A * | 8/1997 | Eaves | 320/118 |
| 5,682,306 A | 10/1997 | Jansen | |
| 5,742,151 A | 4/1998 | Hwang | |
| 5,801,935 A | 9/1998 | Sugden et al. | |
| 5,867,379 A | 2/1999 | Maksimovic et al. | |
| 5,917,864 A | 6/1999 | Asahara | |
| 6,091,215 A | 7/2000 | Lovett et al. | |
| 6,109,048 A | 8/2000 | Kim | |
| 6,181,120 B1 | 1/2001 | Hawkes et al. | |
| 6,225,767 B1 | 5/2001 | Lovett et al. | |
| 6,256,213 B1 | 7/2001 | Illingworth | |
| 6,326,750 B1 | 12/2001 | Marcinkiewicz | |
| 6,366,070 B1 | 4/2002 | Cooke et al. | |
| 6,373,734 B1 | 4/2002 | Martinelli | |
| 6,396,229 B1 | 5/2002 | Sakamoto et al. | |
| 6,404,154 B2 | 6/2002 | Marcinkiewicz et al. | |
| 6,411,065 B1 | 6/2002 | Underwood et al. | |
| 6,441,580 B2 | 8/2002 | Marcinkiewicz | |
| 6,594,158 B2 | 7/2003 | Batarseh et al. | |
| 6,639,377 B2 | 10/2003 | Iwaji et al. | |
| 6,657,877 B2 | 12/2003 | Kashima et al. | |
| 6,731,083 B2 | 5/2004 | Marcinkiewicz | |
| 6,756,757 B2 | 6/2004 | Marcinkiewicz et al. | |
| 6,771,522 B2 | 8/2004 | Hayashi et al. | |
| 6,828,751 B2 | 12/2004 | Sadasivam et al. | |
| 6,927,553 B2 | 8/2005 | Chen | |
| 6,947,504 B1 | 9/2005 | Pettit | |
| 7,151,359 B2 | 12/2006 | Randall et al. | |
| 7,176,644 B2 | 2/2007 | Ueda et al. | |
| 7,193,388 B1 | 3/2007 | Skinner et al. | |
| 7,208,895 B2 | 4/2007 | Marcinkiewicz et al. | |
| 7,295,452 B1 | 11/2007 | Liu | |
| 7,342,379 B2 | 3/2008 | Marcinkiewicz et al. | |
| 7,352,151 B2 | 4/2008 | Fujitsuna et al. | |
| 7,359,224 B2 | 4/2008 | Li | |
| 7,375,485 B2 | 5/2008 | Shahi et al. | |
| 7,403,404 B2 | 7/2008 | Oka et al. | |
| 7,583,049 B2 | 9/2009 | Marcinkiewicz et al. | |
| 7,591,038 B2 | 9/2009 | Murray et al. | |
| 7,626,349 B2 | 12/2009 | Marcinkiewicz et al. | |
| 7,638,967 B2 | 12/2009 | Aizawa et al. | |
| 7,667,423 B2 | 2/2010 | Shahi et al. | |
| 7,683,568 B2 | 3/2010 | Pande et al. | |
| 7,694,538 B2 | 4/2010 | Thorn et al. | |
| 7,733,044 B2 | 6/2010 | Nakamura et al. | |
| 7,905,122 B2 | 3/2011 | Murray et al. | |
| 7,908,893 B2 | 3/2011 | Thorn et al. | |
| 2003/0052640 A1 | 3/2003 | Iwaji et al. | |
| 2003/0057912 A1 | 3/2003 | Iwaji et al. | |
| 2003/0218444 A1 | 11/2003 | Marcinkiewicz et al. | |
| 2004/0211009 A1 | 10/2004 | Murray et al. | |
| 2004/0239296 A1 | 12/2004 | Turchi | |
| 2004/0257028 A1 | 12/2004 | Schulz et al. | |
| 2005/0046370 A1 | 3/2005 | Gallegos-Lopez et al. | |
| 2005/0187752 A1* | 8/2005 | Colby et al. | 703/19 |
| 2005/0204482 A1 | 9/2005 | Murray et al. | |
| 2006/0097688 A1 | 5/2006 | Patel et al. | |
| 2006/0125427 A1 | 6/2006 | Kishibe et al. | |
| 2006/0130504 A1 | 6/2006 | Agrawal et al. | |
| 2006/0290302 A1 | 12/2006 | Marcinkiewicz et al. | |
| 2006/0290304 A1 | 12/2006 | Marcinkiewicz et al. | |
| 2007/0120519 A1 | 5/2007 | Sakamoto et al. | |
| 2007/0170880 A1 | 7/2007 | Shahi et al. | |
| 2008/0002444 A1 | 1/2008 | Shekhawat et al. | |
| 2008/0031021 A1 | 2/2008 | Ros et al. | |
| 2008/0143289 A1 | 6/2008 | Marcinkiewicz et al. | |
| 2008/0185986 A1 | 8/2008 | Marcinkiewicz et al. | |
| 2008/0246445 A1 | 10/2008 | Wrathall | |
| 2008/0278101 A1 | 11/2008 | Shahi et al. | |
| 2008/0284401 A1 | 11/2008 | Oettinger et al. | |
| 2008/0310200 A1 | 12/2008 | Maksimovic et al. | |
| 2009/0021208 A1 | 1/2009 | Romenesko et al. | |
| 2009/0122582 A1 | 5/2009 | Ye et al. | |
| 2009/0153113 A1* | 6/2009 | Zilberberg | 323/282 |
| 2009/0174262 A1 | 7/2009 | Martin et al. | |
| 2009/0243561 A1* | 10/2009 | Tan et al. | 323/208 |
| 2010/0246228 A1* | 9/2010 | Kazlauskas | 363/127 |
| 2010/0292943 A1* | 11/2010 | Minor et al. | 702/64 |
| 2011/0031943 A1 | 2/2011 | Green | |
| 2011/0127938 A1 | 6/2011 | Kawakami et al. | |
| 2011/0156619 A1 | 6/2011 | Nomura | |
| 2011/0175560 A1 | 7/2011 | Akiyama | |

FOREIGN PATENT DOCUMENTS

| | | |
|---|---|---|
| JP | 09308283 A | 11/1997 |
| JP | 2000044135 A | 2/2000 |
| JP | 2002199780 A | 7/2002 |
| JP | 2003018704 A | 1/2003 |
| JP | 2004112942 A | 4/2004 |
| JP | 2007259686 A | 10/2007 |
| KR | 19980080006 A | 6/2002 |
| KR | 20060009199 A | 1/2006 |
| KR | 20060129272 A | 12/2006 |
| KR | 20070064726 A | 6/2007 |
| KR | 20080060290 A | 7/2008 |

OTHER PUBLICATIONS

Written Opinion of the International Searching Authority regarding Application No. PCT/US2010/045025, mailed Apr. 18, 2011.

International Search Report regarding Application No. PCT/US2010/045025, mailed Apr. 18, 2011.

International Search Report regarding Application No. PCT/US2010/045041, mailed Feb. 22, 2011.

Written Opinion of the International Searching Authority regarding Application No. PCT/US2010/045041, mailed Feb. 22, 2011.

Notice of Allowance and Fees Due regarding U.S. Appl. No. 12/852,625, dated Mar. 15, 2012.

International Search Report regarding Application No. PCT/US2010/044982, mailed Feb. 23, 2011.

Written Opinion of the International Searching Authority regarding Application No. PCT/US2010/044982, mailed Feb. 23, 2011.

International Search Report regarding Application No. PCT/US2010/045046, mailed Apr. 6, 2011.

Written Opinion of the International Searching Authority regarding Application No. PCT/US2010/045046, mailed Apr. 6, 2011.

International Seach Report regarding Application No. PCT/US2010/044991, mailed Apr. 22, 2011.

Written Opinion of the International Searching Authority regarding Application No. PCT/US2010/044991, mailed Apr. 22, 2011.

International Search Report regarding Application No. PCT/US2010/044993, mailed Apr. 25, 2011.

Written Opinion of the International Searching Authority regarding Application No. PCT/US2010/044993, mailed Apr. 25, 2011.

International Search Report regarding Application No. PCT/US2010/044998, Apr. 21, 2011.

Written Opinion of the International Searching Authority regarding Application No. PCT/US2010/044998, mailed Apr. 21, 2011.

Written Opinion of the International Searching Authority regarding Application No. PCT/US2010/045005, mailed Apr. 25, 2011.

International Search Report regarding Application No. PCT/US2010/045005, mailed Apr. 25, 2011.

International Search Report regarding Application No. PCT/US2010/045032, mailed Apr. 25, 2011.

Written Opinion of the International Searching Authority regarding Application No. PCT/US2010/045032, mailed Apr. 25, 2011.

"Power-Factor Correction with Interieved Boost Converters in Continuous-Inductor-Current Mode," Laszlo Balogh and Richard Redl, IEEE 1993.

"Advantages of Interleaved Boost Converters for PFC," Michael O'Loughlin, Texas Instruments, Mar. 30, 2006.

"2nd Generation of PFC Solutions," Michael Frisch, Temesi Erno, Yu Jinghui, Tyco Electronics/Power Systems, Sep. 2004.

Notice of Allowance and Fee(s) Due and Notice of Allowability regarding U.S. Appl. No. 12/852,549, dated Apr. 2, 2012.

"Real-Time Computer Control: An Introduction," Bennett, S., Prentice Hall International (UK) Ltd., Chapter 2 (pp. 19-47) and Chapter 4 (pp. 99-128), 1988.

* cited by examiner

SYSTEM AND METHOD FOR REDUCING LINE CURRENT DISTORTION

CROSS-REFERENCE TO RELATED APPLICATIONS

This application claims the benefit of U.S. Provisional Application No. 61/232,646, filed on Aug. 10, 2009. The entire disclosure of the above application is incorporated herein by reference.

FIELD

The present disclosure relates to electric motor control systems and methods and more particularly to power factor correction systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

Power factor is an indicator of the relationship between current and voltage in a circuit, or how effectively a circuit uses real power compared to storing and returning energy to the power source. Power factor may be expressed as a value between zero and one. The circuit's use of actual real power divided by the total volt amps drawn by the circuit may increase as the power factor approaches one. In various implementations, a power factor correction (PFC) system may be implemented. PFC systems generally operate to increase a circuit's power factor toward one, thereby increasing the circuit's use of real power as compared with the amount of reactive power the circuit stores and returns to the source.

SUMMARY

A power factor correction (PFC) system includes an adjustment module, a compensation module, and a duty cycle control module. The adjustment module generates N time advances based on N predetermined time advances and (N−1) time advance adjustments, wherein N is an integer greater than zero. The compensation module generates N compensated versions of an input alternating current (AC) line signal by predicting ahead of the input AC line signal using a gradient of a sinusoidal reference signal and the N time advances, respectively, wherein the sinusoidal reference signal is synchronized with the input AC line signal in phase and frequency. The duty cycle control module generates PFC duty cycles based on the N compensated versions of the input AC line signal.

In other features, a predicted zero-crossing detection module generates an inversion signal based on predicted zero-crossings of the input AC line signal and predicts the zero-crossings based on the input AC line signal, wherein the PFC duty cycles are inverted based on the inversion signal.

In other features, full inversion of the PFC duty cycles occurs over a first length of time, the predicted zero-crossing detection module switches a state of the inversion signal based on a predicted zero-crossing of an advanced version of the input AC line signal, and the predicted zero-crossing detection module generates the advanced version of the input AC line signal by predicting ahead by a time advance, wherein the time advance is based on a sum of a control system delay of the PFC system and half of the first length of time.

In other features, the predicted zero-crossing detection module generates the advanced version of the input AC line signal by extrapolating a present value of the input AC line signal by the time advance along a present gradient of the sinusoidal reference signal.

In other features, a notch filter generates a filtered AC signal by filtering out a predetermined frequency of the input AC line signal, wherein the predetermined frequency is based on a control system delay of the PFC system, the compensation module generates the N compensated versions of the input AC line signal by predicting ahead of the filtered AC signal, and the predicted zero-crossing detection module predicts the zero-crossings based on the filtered AC signal.

In other features, a notch filter generates a filtered AC signal by filtering out a predetermined frequency of the input AC line signal, wherein the predetermined frequency is based on a control system delay of the PFC system, and the compensation module generates the N compensated versions of the input AC line signal by predicting ahead of the filtered AC signal.

In other features, for each version of the N compensated versions of the input AC line signal, the compensation module generates the version by extrapolating a present value of the input AC line signal by a corresponding one of the N time advances along a present gradient of the sinusoidal reference signal.

In other features, the (N−1) time advance adjustments are based on differences between N measured currents having different phases, wherein N is an integer greater than one. In other features, the N predetermined time advances are set at design time.

A method for power factor correction (PFC) includes generating N time advances based on N predetermined time advances and (N−1) time advance adjustments, wherein N is an integer greater than zero, generating N compensated versions of an input alternating current (AC) line signal by predicting ahead of the input AC line signal using a gradient of a sinusoidal reference signal and the N time advances, respectively, wherein the sinusoidal reference signal is synchronized with the input AC line signal in phase and frequency, and generating PFC duty cycles based on the N compensated versions of the input AC line signal.

In other features, the method includes generating an inversion signal based on predicted zero-crossings of the input AC line signal, predicting the zero-crossings based on the input AC line signal, and inverting the PFC duty cycles based on the inversion signal.

In other features, full inversion of the PFC duty cycles occurs over a first length of time, and the method includes switching a state of the inversion signal based on a predicted zero-crossing of an advanced version of the input AC line signal, and generating the advanced version of the input AC line signal by predicting ahead by a time advance, wherein the time advance is based on a sum of a control system delay of a PFC system and half of the first length of time. In other features, the method includes generating the advanced version of the input AC line signal by extrapolating a present value of the input AC line signal by the time advance along a present gradient of the sinusoidal reference signal.

In other features, the method includes generating a filtered AC signal by filtering out a predetermined frequency of the input AC line signal using a notch filter, wherein the predetermined frequency is based on a control system delay of a PFC system. In other features, the method includes generating the N compensated versions of the input AC line signal by predicting ahead of the filtered AC signal, and predicting the zero-crossings based on the filtered AC signal.

In other features, the method includes generating a filtered AC signal by filtering out a predetermined frequency of the input AC line signal using a notch filter, wherein the predetermined frequency is based on a control system delay of a PFC system, and generating the N compensated versions of the input AC line signal by predicting ahead of the filtered AC signal.

In other words, the method includes for each version of the N compensated versions of the input AC line signal, generating the version by extrapolating a present value of the input AC line signal by a corresponding one of the N time advances along a present gradient of the sinusoidal reference signal.

In other features, the (N−1) time advance adjustments are based on differences between N measured currents having different phases, wherein N is an integer greater than one. In other features, the N predetermined time advances are set at design time.

A method for power factor correction (PFC) includes receiving an input alternating current (AC) line signal, generating a filtered AC signal by filtering out a predetermined frequency of the input AC line signal using a notch filter, wherein the predetermined frequency is based on a control system delay of a PFC system, generating a sinusoidal reference signal that is synchronized with the input AC line signal in phase and frequency, generating N time advances based on N predetermined time advances and (N−1) time advance adjustments, wherein N is an integer greater than zero, for each of N compensated versions of the input AC line signal, generating the version by extrapolating a present value of the filtered AC line signal by a corresponding one of the N time advances along a present gradient of the sinusoidal reference signal, generating PFC duty cycles based on the N compensated versions of the input AC line signal, predicting zero-crossings based on the filtered AC line signal, generating an inversion signal based on predicted zero-crossings of the filtered AC line signal, inverting the PFC duty cycles based on the inversion signal, generating an advanced version of the filtered AC line signal by predicting ahead by a time advance that includes a sum of a control system delay of a PFC system and half of a time for full inversion of the PFC duty cycles, and switching a state of the inversion signal based on a predicted zero-crossing of the advanced version of the filtered AC line signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
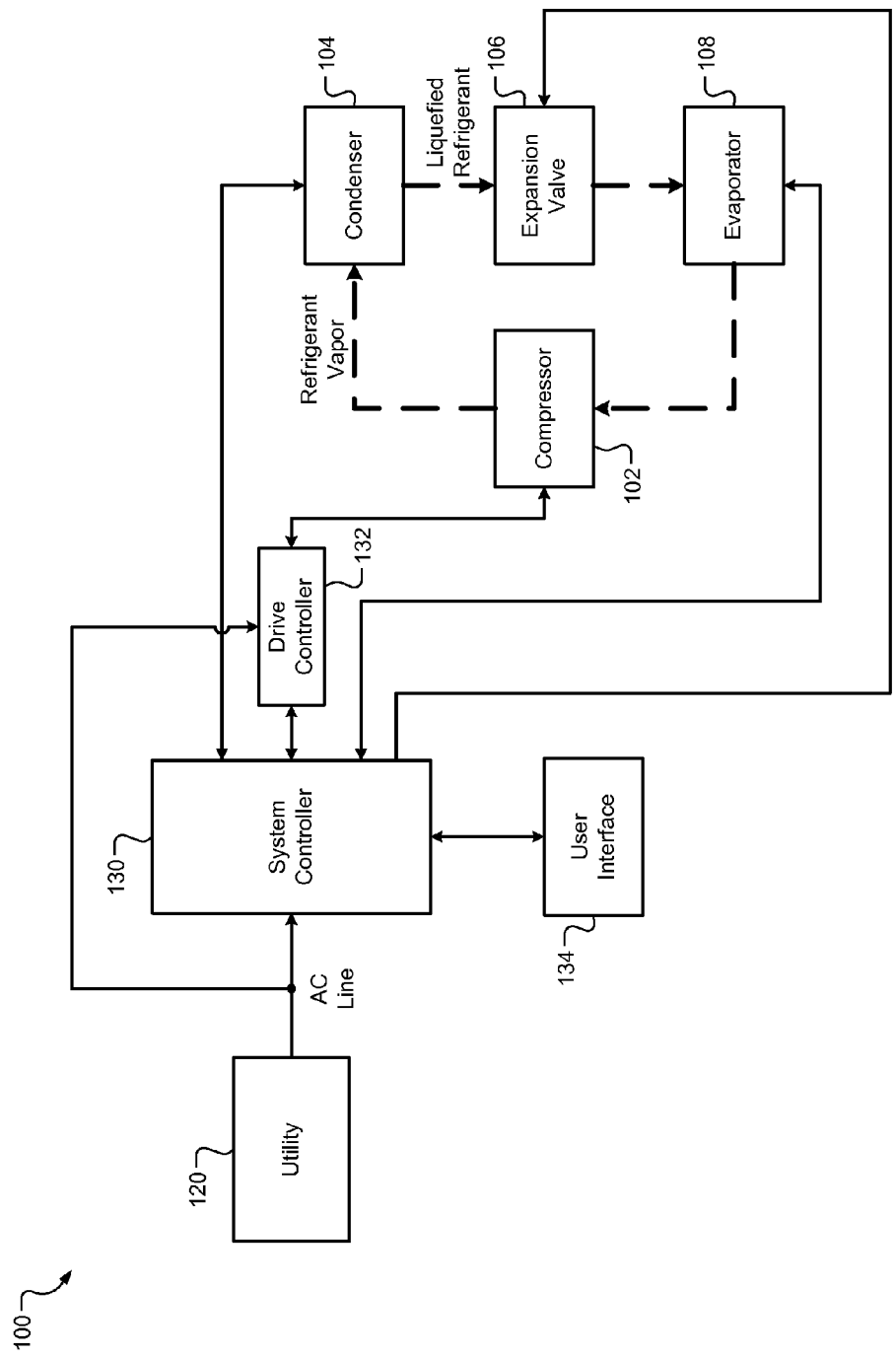
FIG. 1 is a functional block diagram of an example refrigeration system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of a refrigeration system 100 is presented. The refrigeration system 100 may include a compressor 102, a condenser 104, an expansion valve 106, and an evaporator 108. According to the principles of the present disclosure, the refrigeration system 100 may include additional and/or alternative components. In addition, the present disclosure is applicable to other suitable types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts (V) root mean squared (RMS) or at another suitable voltage. In various implementations, the utility 120 may provide three-phase power at approximately 400 Volts RMS or 480 Volts RMS at a line frequency of, for example, 50 or 60 Hz. The utility 120 may provide the AC power to the system controller 130 via an AC line. The AC power may also be provided to a drive controller 132 via the AC line.

The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs to the drive controller 132. The user inputs may include, for example, a desired temperature, requests regarding operation of a fan (e.g., the evaporator fan), and/or other suitable inputs. The system controller 130 may control operation of the fans of the condenser 104, the evaporator 108, and/or the expansion valve 106.

The drive controller 132 may control the compressor 102 based on commands from the system controller 130. For example only, the system controller 130 may instruct the drive controller 132 to operate the compressor motor at a certain speed. In various implementations, the drive controller 132 may also control the condenser fan.

Figure 2:
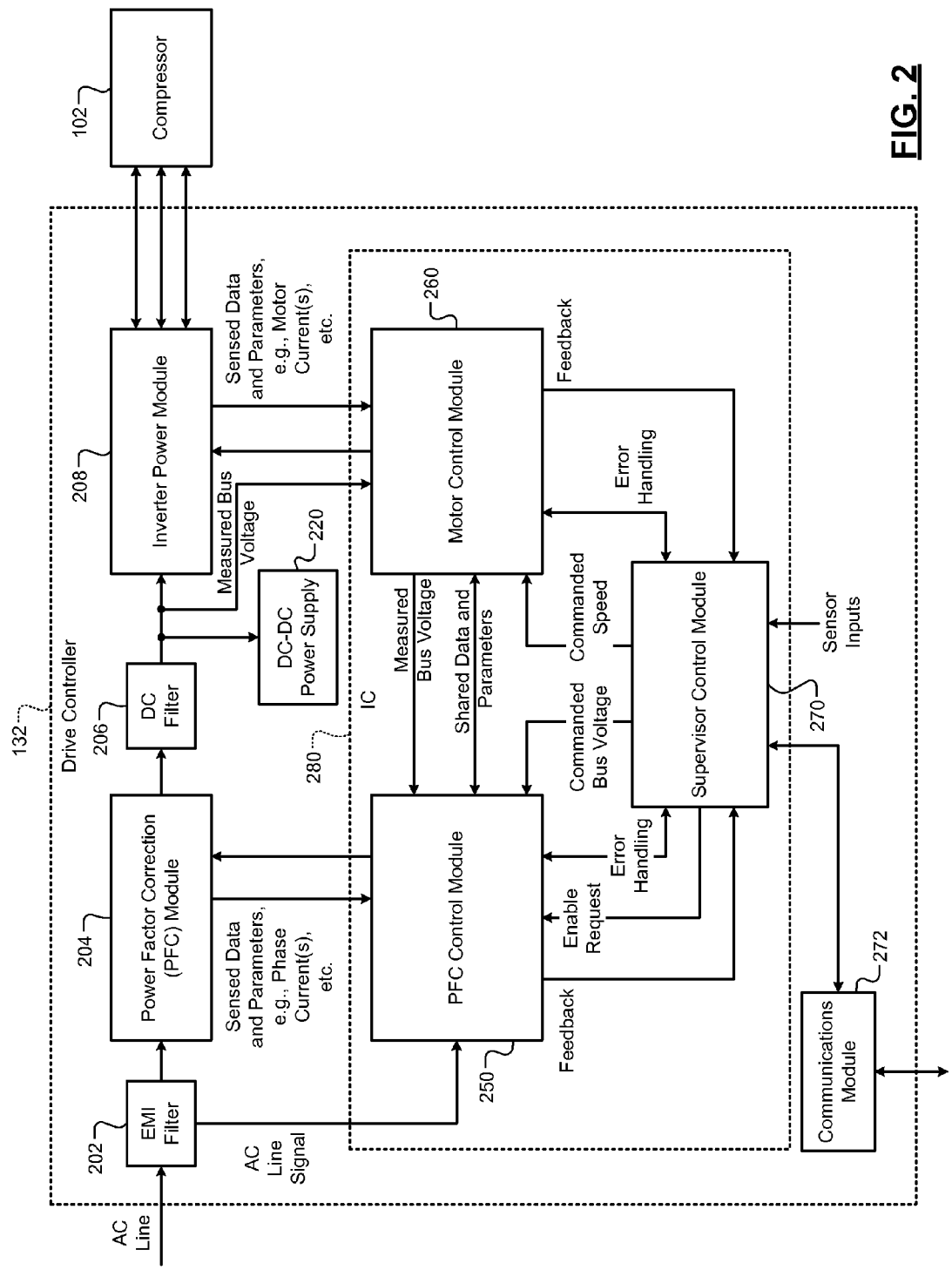
FIG. 2 is a functional block diagram of an example drive controller and an example compressor.

Referring now to FIG. 2, a functional block diagram of the drive controller 132 and the compressor 102 is presented. An electromagnetic interference (EMI) filter 202 reduces EMI that might otherwise be injected back onto the AC line by the drive controller 132. The EMI filter 202 may also filter EMI carried on the AC line.

A power factor correction (PFC) module 204 receives AC power from the AC line as filtered by the EMI filter 202. The PFC module 204 (described in more detail with reference to FIGS. 3a, 3b, and 3c) rectifies the AC power, thereby converting the AC input power into direct current (DC) power. The generated DC power is provided at positive and negative terminals of the PFC module 204. The PFC module 204 also selectively provides power factor correction between the input AC power and the generated DC power.

The PFC module 204 selectively boosts the AC power to a DC voltage that is greater than a peak voltage of the AC power. For example only, the PFC module 204 may operate in a passive mode, where the DC voltage generated is less than a peak voltage of the AC power. The PFC module 204 may also operate in an active mode, where the DC voltage generated is greater than the peak voltage of the AC power. A DC voltage that is greater than the peak voltage of the AC power may be referred to as a boosted DC voltage.

AC power having an RMS voltage of 230 V has a peak voltage of approximately 325 V (230 V multiplied by the square root of 2). For example only, when operating from AC power having an RMS voltage of 230 V, the PFC module 204 may generate boosted DC voltages between approximately 350 V and approximately 410 V. For example only, the lower limit of 350 V may be imposed to avoid unstable operating regimes of the PFC module 204. The limits may vary, such as with the actual AC input voltage value. In various implementations, the PFC module 204 may be able to achieve higher boosted DC voltages than 410 V. However, the upper limit may be imposed to improve long-term reliability of components that would experience greater stress at higher voltages, such as components in a DC filter 206. In various implementations, the upper and/or lower limits may be varied.

The DC filter 206 filters the DC power generated by the PFC module 204. The DC filter 206 minimizes ripple voltage present in the DC power that results from the conversion of AC power to DC power. In various implementations, the DC filter 206 may include one or more series or parallel filter capacitors connected between the positive and negative terminals of the PFC module 204. In such implementations, the positive and negative terminals of the PFC module 204 may be connected directly to positive and negative terminals of an inverter power module 208.

The inverter power module 208 (described in more detail with reference to FIGS. 4a, 4b, and 4c) converts the DC power, as filtered by the DC filter 206, into AC power that is provided to the compressor motor. For example only, the inverter power module 208 may convert the DC power into three-phase AC power and provide the phases of the AC power to three respective windings of the motor of the compressor 102. In other implementations, the inverter power module 208 may convert the DC power into more or fewer phases of power.

A DC-DC power supply 220 may also receive the filtered DC power. The DC-DC power supply 220 converts the DC power into one or more DC voltages that are suitable for various components and functions. For example only, the DC-DC power supply 220 may reduce the voltage of the DC power to a first DC voltage that is suitable for powering digital logic and a second DC voltage that is suitable for controlling switches within the PFC module 204. For example only, the second DC voltage may be selectively applied to gate terminals of the switches. In various implementations, DC power may be provided by another DC power source (not shown)—for example, a DC voltage derived via a transformer from the main 230 VAC input.

In various implementations, the first DC voltage may be approximately 3.3 V and the second DC voltage may be approximately 15 V. In various implementations, the DC-DC power supply 220 may also generate a third DC voltage. For example only, the third DC voltage may be approximately 1.2 V. The third DC voltage may be derived from the first DC voltage using a voltage regulator. For example only, the third DC voltage may be used for core digital logic and the first DC voltage may be used for input/output circuitry of a PFC control module 250 and a motor control module 260.

The PFC control module 250 controls the PFC module 204, and the motor control module 260 controls the inverter power module 208. In various implementations, the PFC control module 250 controls switching of the switches within the PFC module 204, and the motor control module 260 controls switching of switches within the inverter power module 208. The PFC module 204 may be implemented with 1, 2, 3, or more phases.

A supervisor control module 270 may communicate with the system controller 130 via a communications module 272. The communications module 272 may include an input/output port and other suitable components to serve as an interface between the system controller 130 and the supervisor control module 270. The communications module 272 may implement wired and/or wireless protocols.

The supervisor control module 270 provides various commands to the PFC control module 250 and the motor control module 260. For example, the supervisor control module 270 may provide a commanded speed to the motor control module 260. The commanded speed corresponds to a desired rotational speed of the motor of the compressor 102.

In various implementations, the commanded compressor speed may be provided to the supervisor control module 270 by the system controller 130. In various implementations, the supervisor control module 270 may determine or adjust the commanded compressor speed based on inputs provided via the communications module 272 and/or parameters measured by various sensors (i.e., sensor inputs). The supervisor control module 270 may also adjust the commanded compressor speed based on feedback from the PFC control module 250 and/or the motor control module 260.

The supervisor control module 270 may also provide other commands to the PFC control module 250 and/or the motor control module 260. For example, based on the commanded speed, the supervisor control module 270 may command the PFC control module 250 to produce a commanded bus voltage. The supervisor control module 270 may adjust the commanded bus voltage based on additional inputs, such as operating parameters of the inverter power module 208 and the measured voltage of the incoming AC line.

The supervisor control module 270 may diagnose faults in various systems of the drive controller 132. For example only, the supervisor control module 270 may receive fault information from the PFC control module 250 and/or the motor control module 260. The supervisor control module 270 may also receive fault information via the communications module 272. The supervisor control module 270 may manage reporting and clearing of faults between the drive controller 132 and the system controller 130.

Responsive to the fault information, the supervisor control module 270 may instruct the PFC control module 250 and/or the motor control module 260 to enter a fault mode. For example only, in the fault mode, the PFC control module 250 may halt switching of the switches of the PFC module 204, while the motor control module 260 may halt switching of the switches of the inverter power module 208. In addition, the motor control module 260 may directly provide fault information to the PFC control module 250. In this way, the PFC control module 250 can respond to a fault identified by the motor control module 260 even if the supervisor control module 270 is not operating correctly and vice versa.

The PFC control module 250 may control switches in the PFC module 204 using pulse width modulation (PWM). More specifically, the PFC control module 250 may generate PWM signals that are applied to the switches of the PFC module 204. The duty cycle of the PWM signals is varied to produce desired currents in the switches of the PFC module 204. The desired currents are calculated based on an error between the measured DC bus voltage and a desired DC bus voltage. In other words, the desired currents are calculated in order to achieve the desired DC bus voltage. The desired currents may also be based on achieving desired power factor correction parameters, such as the shapes of current waveforms in the PFC module 204. The PWM signals generated by the PFC control module 250 may be referred to as PFC PWM signals.

The motor control module 260 may control switches in the inverter power module 208 using PWM in order to achieve the commanded compressor speed. The PWM signals generated by the motor control module 260 may be referred to as inverter PWM signals. The duty cycle of the inverter PWM signals controls the current through the windings of the motor (i.e., motor currents) of the compressor 102. The motor currents control motor torque, and the motor control module 260 may control the motor torque to achieve the commanded compressor speed.

In addition to sharing fault information, the PFC control module 250 and the motor control module 260 may also share data. For example only, the PFC control module 250 may receive data from the motor control module 260 such as load, motor currents, estimated motor torque, inverter temperature, duty cycle of the inverter PWM signals, and other suitable parameters. The PFC control module 250 may also receive data from the motor control module 260, such as the measured DC bus voltage. The motor control module 260 may receive data from the PFC control module 250 such as AC line voltage, current(s) through the PFC module 204, estimated AC power, PFC temperature, commanded bus voltage, and other suitable parameters.

In various implementations, some or all of the PFC control module 250, the motor control module 260, and the supervisor control module 270 may be implemented on an integrated circuit (IC) 280. For example only, the IC 280 may include a digital signal processor (DSP), a field programmable gate array (FPGA), a microprocessor, etc. In various implementations, additional components may be included in the IC 280. Additionally, various functions shown inside the IC 280 in FIG. 2 may be implemented external to the IC 280, such as in a second IC or in discrete circuitry. For example only, the supervisor control module 270 may be integrated with the motor control module 260.

Figure 3A:
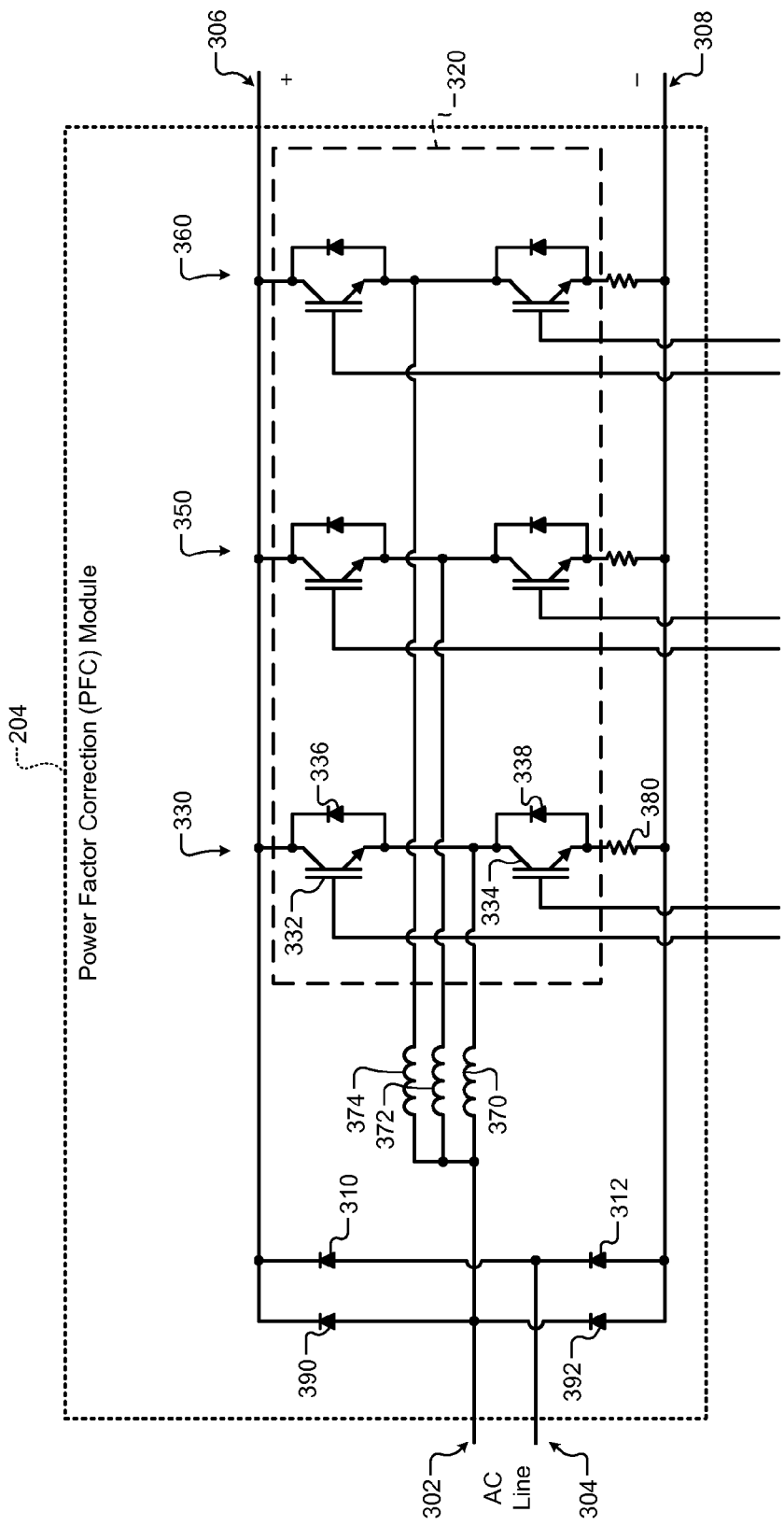
FIGS. 3a-3c are simplified schematics of example power factor correction (PFC) modules.

FIG. 3a is a schematic of an example implementation of the PFC module 204. The PFC module 204 receives AC power via first and second AC input terminals 302 and 304. The AC power may be, for example, the AC power output by the EMI filter 202. In various implementations, the signals at the first and second AC input terminals 302 and 304 may both be time-varying with respect to an earth ground. The PFC module 204 outputs DC power to the DC filter 206 and the inverter power module 208 via a positive DC terminal 306 and a negative DC terminal 308.

An anode of a first rectifier diode 310 is connected to the second AC input terminal 304, and a cathode of the first rectifier diode 310 is connected to the positive DC terminal 306. An anode of a second rectifier diode 312 is connected to the negative DC terminal 308, and a cathode of the second rectifier diode 312 is connected to the second AC input terminal 304. Each of the rectifier diodes 310 and 312 may be implemented as one or more individual series or parallel diodes.

A switch block 320 is connected between the positive and negative DC terminals 306 and 308. The switch block 320 includes a first PFC leg 330 that includes first and second switches 332 and 334. The switches 332 and 334 each include a first terminal, a second terminal, and a control terminal. In various implementations, each of the switches 332 and 334 may be implemented as an insulated gate bipolar transistor (IGBT). In such implementations, the first, second, and control terminals may correspond to collector, emitter, and gate terminals, respectively.

The first terminal of the first switch 332 is connected to the positive DC terminal 306. The second terminal of the first switch 332 is connected to the first terminal of the second switch 334. The second terminal of the second switch 334 may be connected to the negative DC terminal 308. In various implementations, the second terminal of the second switch 334 may be connected to the negative DC terminal 308 via a shunt resistor 380 to enable measuring current flowing through the first PFC leg 330.

The control terminals of the switches 332 and 334 receive generally complementary PFC PWM signals from the PFC control module 250. In other words, the PFC PWM signal provided to the first switch 332 is opposite in polarity to the PFC PWM signal provided to the second switch 334. Short circuit current may flow when the turning on of one of the switches 332 and 334 overlaps with the turning off of the other of the switches 332 and 334. Therefore, both the switches 332 and 334 may be turned off during a deadtime before either one of the switches 332 and 334 is turned on. Therefore, generally complementary means that two signals are opposite for most of their periods. However, around transitions, both signals may be low or high for some overlap period.

The first PFC leg 330 may also include first and second diodes 336 and 338 connected anti-parallel to the switches 332 and 334, respectively. In other words, an anode of the first diode 336 is connected to the second terminal of the first switch 332, and a cathode of the first diode 336 is connected to the first terminal of the first switch 332. An anode of the second diode 338 is connected to the second terminal of the second switch 334, and a cathode of the second diode 338 is connected to the first terminal of the second switch 334.

The switch block 320 may include one or more additional PFC legs. In various implementations, the switch block 320 may include one additional PFC leg. As shown in FIG. 3a, the switch block 320 includes second and third PFC legs 350 and 360. The number of PFC legs included in the switch block 320 may be chosen based on performance and cost. For example only, the magnitude of ripple (voltage and current) in the DC output of the PFC module 204 may decrease as the number of PFC legs increases. In addition, the amount of ripple current in the AC line current may decrease as the number of PFC legs increase. However, parts costs and implementation complexity may increase as the number of PFC legs increases.

The second and third PFC legs 350 and 360 of the switch block 320 may be similar to the first PFC leg 330. For example only, the second and third PFC legs 350 and 360 may each include respective components for the switches 332 and 334, the diodes 336 and 338, and respective shunt resisters connected in the same manner as the first PFC leg 330.

The PFC PWM signals provided to the switches of the additional PFC legs may also be complementary in nature. The PFC PWM signals provided to the additional PFC legs may be phase shifted from each other and from the PFC PWM signals provided to the first PFC leg 330. For example only, the phase shift of the PFC PWM signals may be determined by dividing 360 degrees (°) by the number of PFC legs. For example, when the switch block 320 includes three PFC legs, the PFC PWM signals may be phase shifted from each other by 120° (or 180° for two phases, or 90° for four phases, etc.). Phase shifting the PFC PWM signals may cancel ripple in the AC line current as well as the DC output.

The PFC module 204 includes a first inductor 370. The first inductor 370 is connected between the first AC input terminal 302 and the second terminal of the first switch 332. Additional inductors may connect the first AC input terminal 302 to additional PFC legs. For example only, FIG. 3a shows a second inductor 372 and a third inductor 374 connecting the first AC input terminal 302 to the second and third PFC legs 350 and 360, respectively.

A voltage may be measured across the shunt resistor 380 to determine current through the first PFC leg 330 according to Ohm's law. An amplifier (not shown), such as an operational amplifier, may amplify the voltage across the shunt resistor 380. The amplified voltage may be digitized, buffered, and/or filtered to determine the current through the first PFC leg 330. Current through other PFC legs may be determined using respective shunt resistors.

Figure 3B:
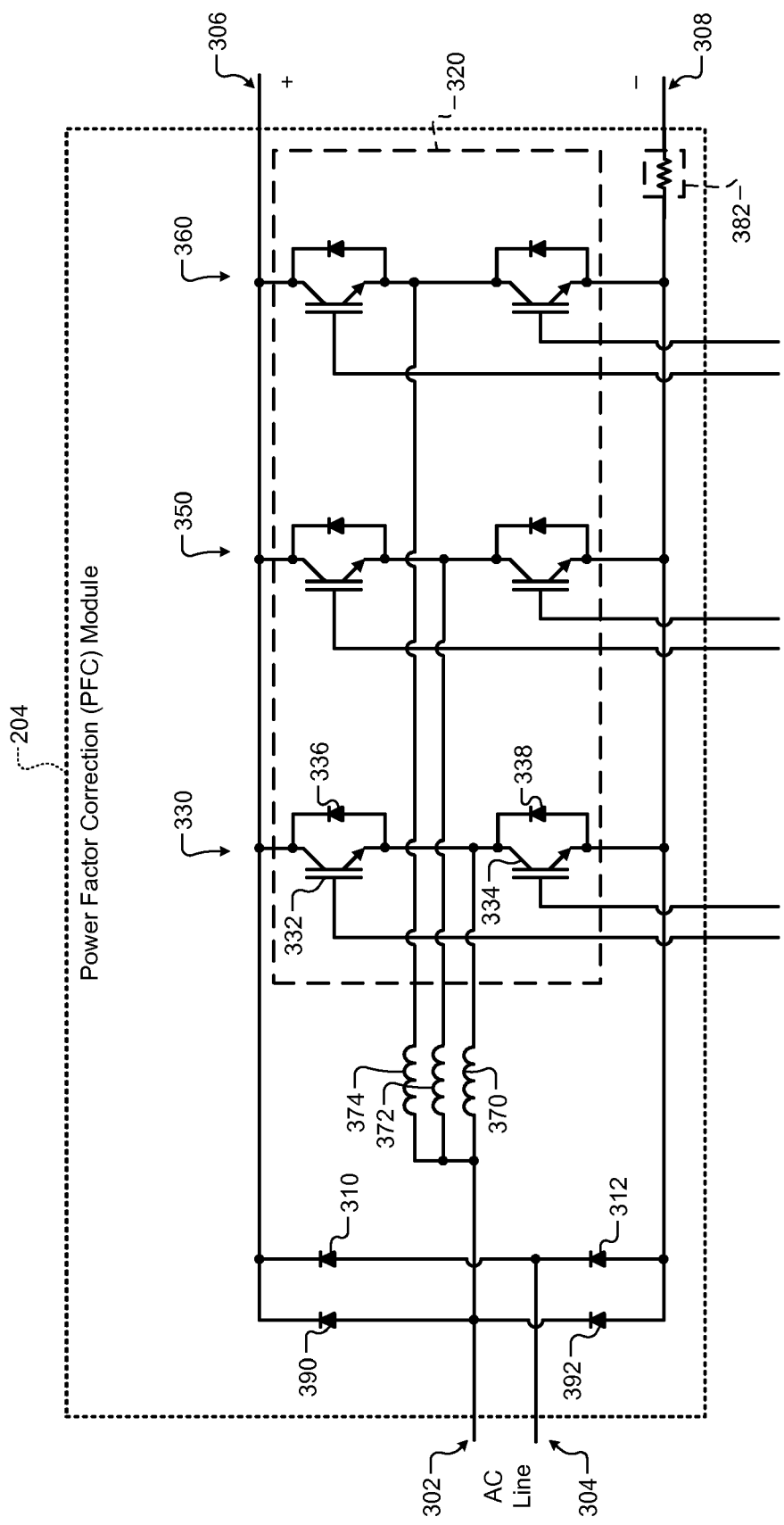

Additionally or alternatively, a resistor 382 may be connected in series with the negative DC terminal 308, as shown in FIG. 3b. Current through the resistor 382 may therefore indicate a total current output from the PFC module 204. Current through each of the PFC legs 330, 350, and 360 may be inferred from the total current based on the known phase timing of the current through the PFC legs 330, 350, and 360.

Figure 3C:
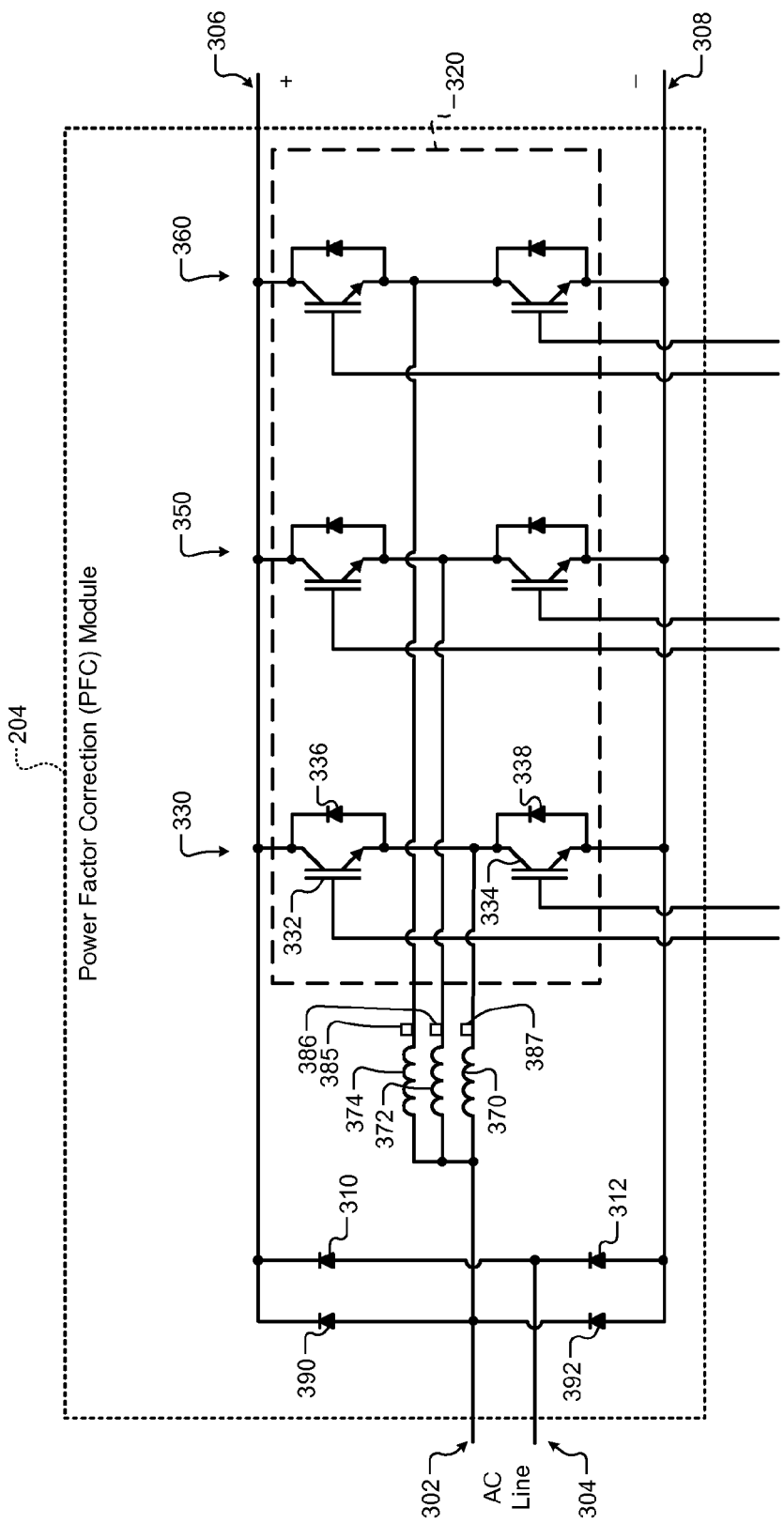

Any method of measuring or sensing current through any or all of the PFC legs 330, 350, 360 may be used. For example, in various implementations, the current through the first PFC leg 330 may be measured using a current sensor 387 (as shown in FIG. 3c). For example only, the current sensor 387 may be implemented in series with the first inductor 370. In various implementations, the current sensor 387 may include a Hall-effect sensor that measures the current through the first PFC leg 330 based on magnetic flux around the first inductor 370. Current through the PFC legs 350 and 360 may also be measured using associated current sensors 388 and 389, respectively.

The PFC module 204 may also include first and second bypass diodes 390 and 392. An anode of the first bypass diode 390 is connected to the first AC input terminal 302, and a cathode of the first bypass diode 390 is connected to the positive DC terminal 306. An anode of the second bypass diode 392 is connected to the negative DC terminal 308, and a cathode of the second bypass diode 392 is connected to the first AC input terminal 302.

The bypass diodes 390 and 392 may be power diodes, which may be designed to operate at low frequencies, such as, for example, frequencies less than approximately 100 Hz or approximately 200 Hz. Resistance of the bypass diodes 390 and 392 may be less than resistance of the inductors 370, 372, and 374. Therefore, when the switches 332 and 334 within the switch block 320 are not being switched, current may flow through the bypass diodes 390 and 392 instead of the diodes 336 and 338.

When the PFC module 204 is operating to create a boosted DC voltage, the boosted DC voltage will be greater than a peak voltage on the AC line. The bypass diodes 390 and 392 will therefore not be forward biased and will remain inactive. The bypass diodes 390 and 392 may provide lightning strike protection and power surge protection.

In various implementations, the bypass diodes 390 and 392 may be implemented with the rectifier diodes 310 and 312 in a single package. For example only, Vishay model number 26MT or 36MT or International Rectifier, model number 26 MB or 36 MB may be used as the bypass diodes 390 and 392 and the rectifier diodes 310 and 312. The rectifier diodes 310 and 312 carry current whether the PFC module 204 is generating a boosted DC voltage or not. Therefore, in various implementations, each of the rectifier diodes 310 and 312 may be implemented as two physical diodes connected in parallel. Current sensors may be used to measure PFC phase currents in series with the inductors 370, 372, and 374.

Figure 4A:
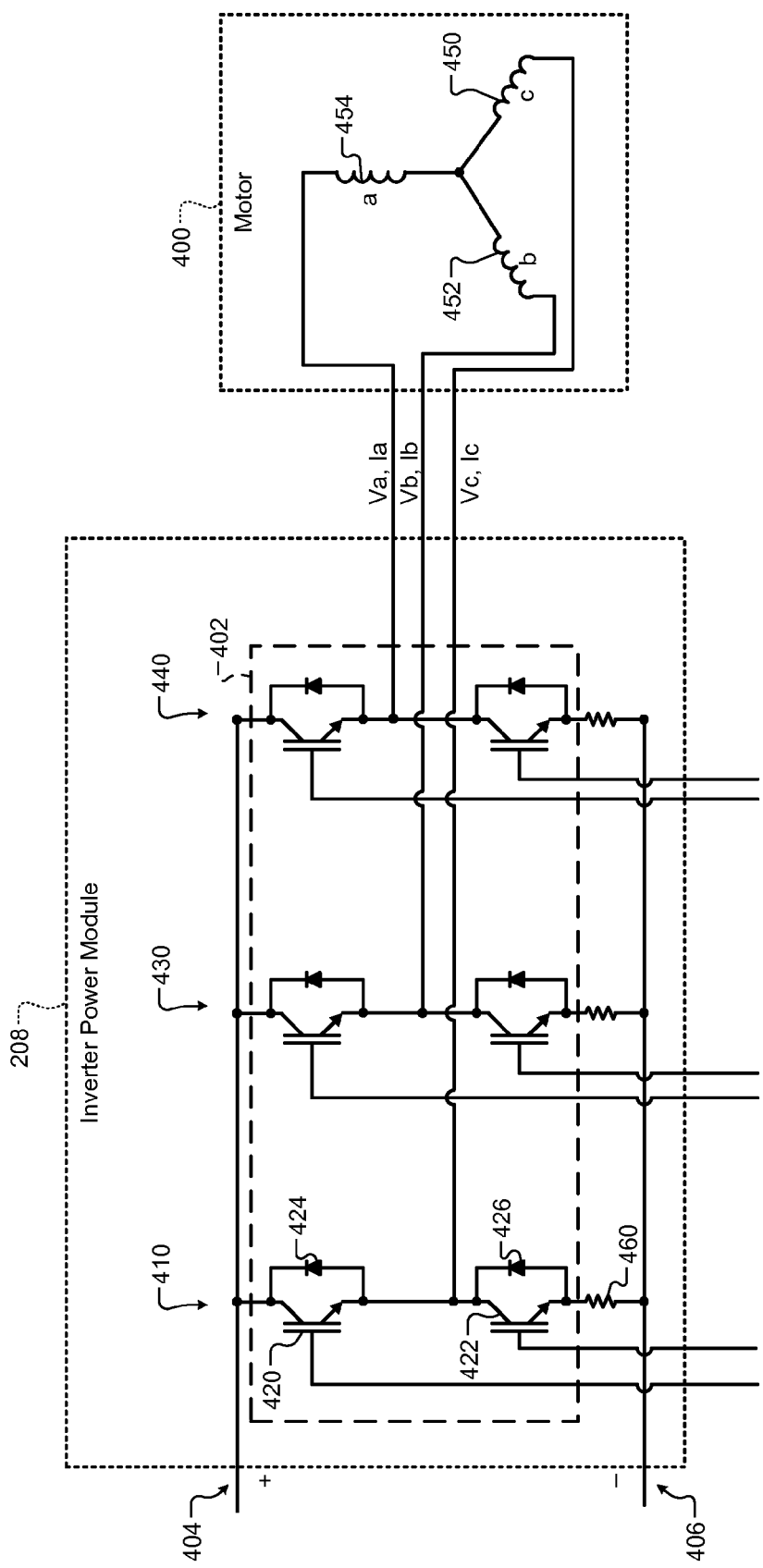
FIGS. 4a-4c are simplified schematics of example inverter power modules and example motors.

Referring now to FIG. 4a, a simplified schematic of a motor 400 and an example implementation of the inverter power module 208 is presented. The motor 400 is a component of the compressor 102 of FIG. 2. However, the principles of FIGS. 4a-4c may apply to other motors, including a motor of the condenser 104. The inverter power module 208 includes a switch block 402. In various implementations, the switch block 402 and the switch block 320 of the PFC module 204 may be implemented using a similar part. For example only, in FIG. 4a, a first inverter leg 410 includes first and second switches 420 and 422 and first and second diodes 424 and 426, which are arranged similarly to the switches 332 and 334 and the diodes 336 and 338 of FIG. 3a.

The switch block 402 receives the filtered DC voltage from the DC filter 206 via a positive DC terminal 404 and a negative DC terminal 406. The first terminal of the first switch 420 may be connected to the positive DC terminal 404, while the second terminal of the second switch 422 may be connected to the negative DC terminal 406. The control terminals of the switches 420 and 422 receive generally complementary inverter PWM signals from the motor control module 260.

The switch block 402 may include one or more additional inverter legs. In various implementations, the switch block 402 may include one inverter leg for each phase or winding of the motor 400. For example only, the switch block 402 may include second and third inverter legs 430 and 440, as shown in FIG. 4a. The inverter legs 410, 430, and 440 may provide current to windings 450, 452, and 454 of the motor 400, respectively. The windings 454, 452, and 450 may be referred to as windings a, b, and c, respectively. Voltage applied to the windings 454, 452, and 450 may be referred to as Va, Vb, and Vc, respectively. Current through the windings 454, 452, and 450 may be referred to as Ia, Ib, and Ic, respectively.

For example only, first ends of the windings 450, 452, and 454 may be connected to a common node. Second ends of the windings 450, 452, and 454 may be connected to the second terminal of the first switch 420 of the inverter legs 410, 430, and 440, respectively.

The inverter power module 208 may also include a shunt resistor 460 that is associated with the first inverter leg 410. The shunt resistor 460 may be connected between the second terminal of the second switch 422 and the negative DC terminal 406. In various implementations, respective shunt resistors may be located between each of the inverter legs 430 and 440 and the negative DC terminal 406. For example only, current through the first winding 450 of the motor 400 may be determined based on the voltage across the shunt resistor 460 of the first inverter leg 410. In various implementations, the shunt resistor of one of the inverter legs 410, 430, or 440 may be omitted. In such implementations, current may be inferred based on the measurements of the remaining shunt resistors.

Figure 4B:
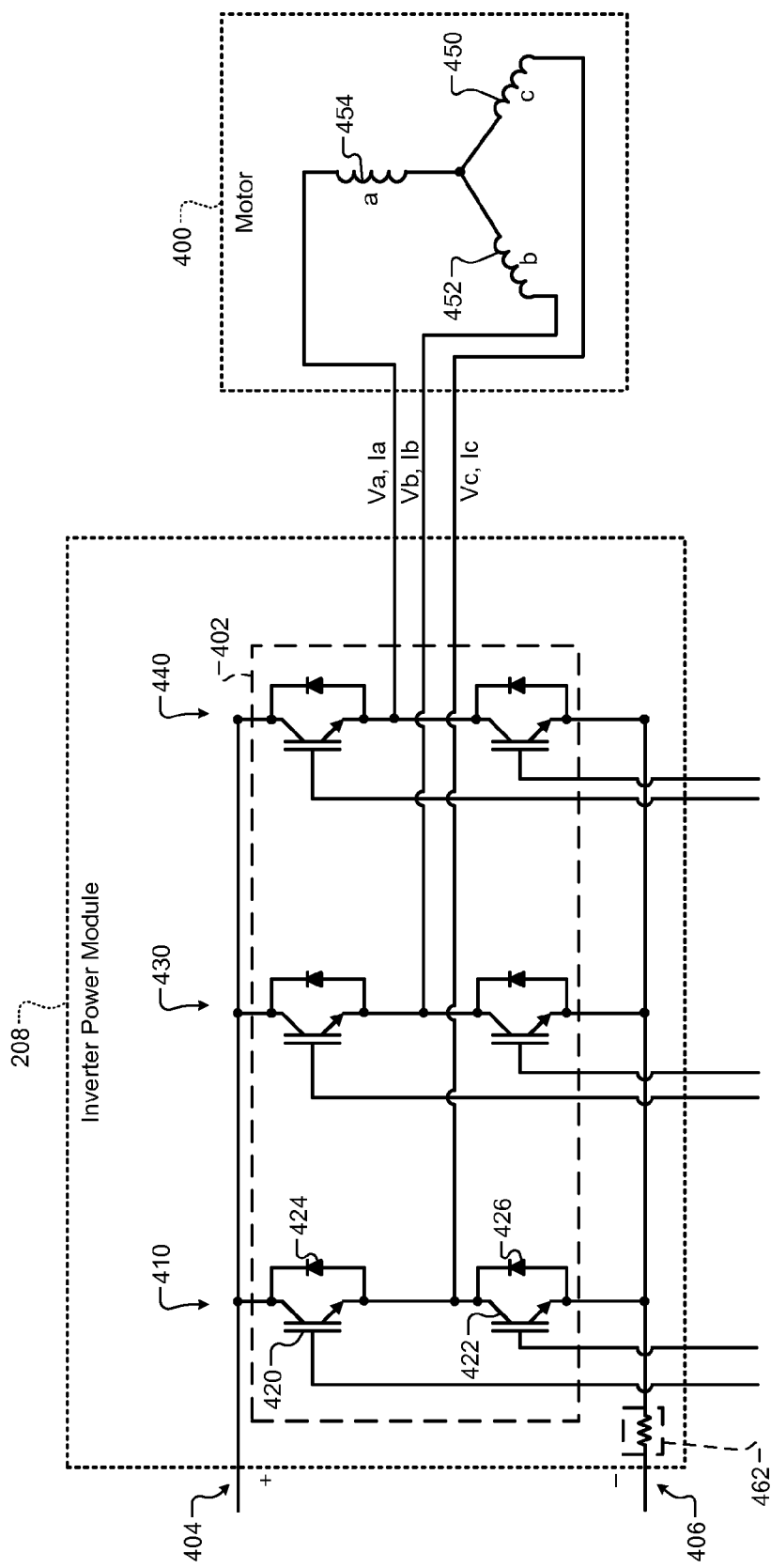
Figure 4C:
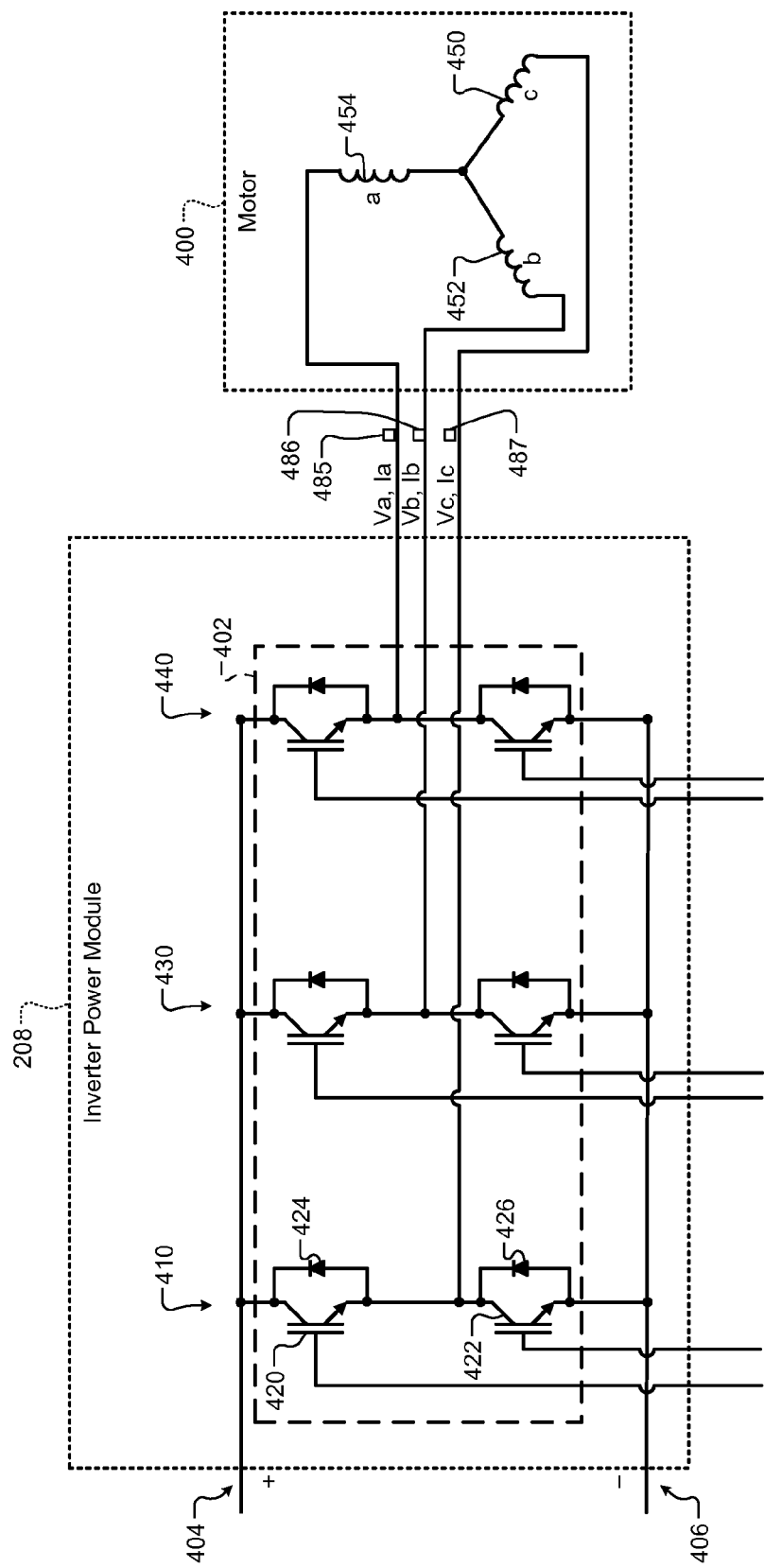

Additionally or alternatively, a resistor 462 may be connected in series with the negative DC terminal 406, as shown in FIG. 4b. Current through the resistor 462 may therefore indicate a total current consumed by the inverter power module 208. Current through each of the inverter legs 410, 430, and 440 may be inferred from the total current based on the known phase timing of the current through the inverter legs 410, 430, and 440. Further discussion of determining currents in an inverter can be found in commonly assigned U.S. Pat. No. 7,193,388, issued Mar. 20, 2007, which is incorporated by reference herein in its entirety.

Any method of measuring or sensing current through any or all of the inverter legs 410, 430, and 440 may be used. For example, in various implementations, the current through the first inverter leg 410 may be measured using a current sensor 487 (shown in FIG. 4c). For example only, the current sensor 487 may be implemented between the first inverter leg 410 and the first winding 450. Current through the inverter legs 430 and 440 may also be measured using associated current sensors 488 and 489, respectively. In various implementations, current sensors may be associated with two of the inverter legs 410, 430, and 440. The current through the other one of the inverter legs 410, 430, and 440 may be determined based on an assumption that the current in the motor windings sums to zero.

Figure 5:
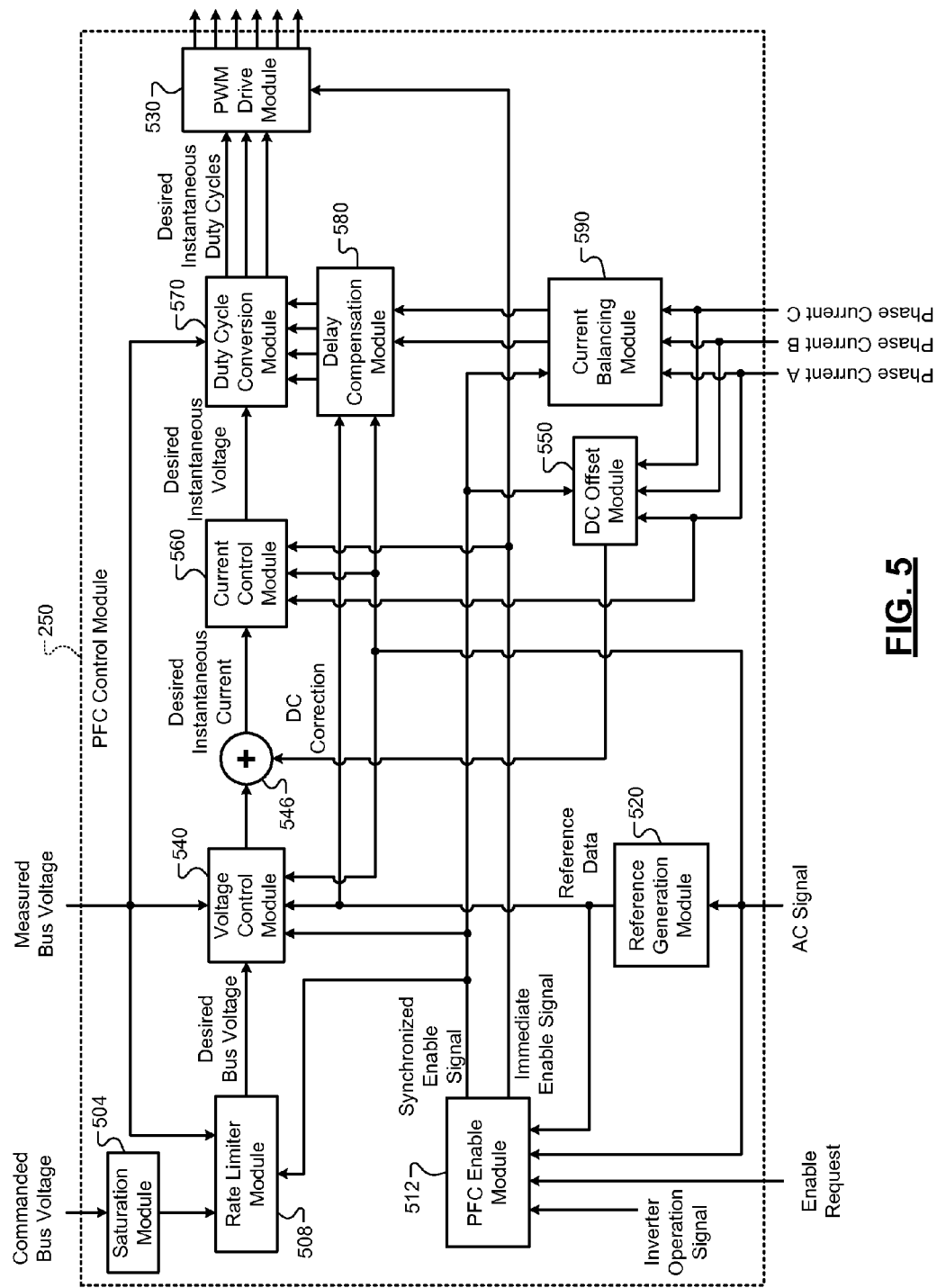
FIG. 5 is a functional block diagram of an example PFC control module.

Referring now to FIG. 5, a functional block diagram of an example implementation of the PFC control module 250 is shown. The PFC control module 250 receives a commanded bus voltage, which may be from the supervisor control module 270 of FIG. 2. A saturation module 504 may apply limits to the commanded bus voltage. As used herein, a saturation module may selectively enforce a lower limit, an upper limit, both upper and lower limits, or neither limit. The upper and lower limits may be predetermined and/or may be updated based upon various factors.

For example only, if an upper limit is being enforced, the saturation module 504 limits the commanded bus voltage to the upper limit when the commanded bus voltage is greater than the upper limit. Similarly, if a lower limit is being enforced, the saturation module 504 limits the commanded bus voltage to the lower limit when the commanded bus voltage is less than the lower limit.

In various implementations, the upper limit may be set based on recommended operating parameters of the circuit components. For example only, the upper limit may be set based on a desired life expectancy of capacitors in the DC filter 206. For example only, the upper limit may be 410 V. The upper limit may be reduced to increase the expected operational lifetime of the PFC control module 250. However, reducing the upper limit may limit the speed the motor 400 can achieve at higher loads.

A rate limiter module 508 receives the commanded bus voltage as limited by the saturation module 504. The rate limiter module 508 limits the rate of change of the limited command bus voltage and outputs a desired bus voltage. The applied rate limit reduces rapid changes in desired bus voltage that might otherwise cause rapid changes in current. Rapid changes in current may cause the incoming AC line to sag and may also cause oscillations and other control instability.

A PFC enable module 512 receives the enable request from the supervisor control module 270 of FIG. 2 and generates a synchronized enable signal based on the enable request. The synchronized enable signal may be synchronized to zero-crossings of the AC line. The synchronized enable signal may be synchronized to the zero-crossings of the AC line in order to minimize a sudden jump in current when the PFC control module 250 is enabled. This current jump may lead to control instability and may introduce distortions, such as a notch, to the AC line.

Because the AC line may be noisy, making it difficult to differentiate between true zero-crossings and noise, a reference signal may be used to determine the zero-crossings. The reference signal is generated by a reference generation module 520. The reference generation module 520 receives an AC signal and generates a sinusoidal reference signal locked to the phase and frequency of the AC signal but without the noise and other distortions of the AC signal. The AC signal entering the PFC control module 250 may be an isolated, scaled down, and digitized version of the actual AC line.

In various implementations, the sinusoidal reference signal may be generated in discrete time, with each point on the reference signal generated by evaluating a sinusoidal function, such as sine or cosine, whose arguments are the phase and frequency determined from the AC line. The phase and frequency may be recalculated at each time step, and the resulting sinusoidal reference signal may therefore not be a pure sine wave. Instead, the phase shift and frequency may vary over the course of a period. The phase and frequency may both be low-pass filtered, such as by rate limiters, so that there are no abrupt changes in either the phase or frequency.

The reference generation module 520 outputs reference data including at least the sinusoidal reference signal. The reference data may also include the frequency of the reference signal, the period of the reference signal, the time-varying angle of the reference signal, and/or the time-varying derivative (or, gradient) of the reference signal. The gradient may be generated by differentiating the reference signal. Alternatively, the gradient may be generated using a cosine function whose arguments are the determined phase and frequency. The gradient may be generated in other ways, such as by using trigonometric identities. For example, the gradient may be generated using a sine function whose arguments are the determined frequency and 90 degrees plus the determined phase.

The reference data may also include a scaled version of the reference signal and/or the gradient. The scaling factor may be based on the peak voltage of the AC line. Because directly measuring the peak voltage may be susceptible to noise on the AC line, the peak voltage may instead be determined by multiplying the mean voltage (which is less susceptible to noise) by pi/2. As used herein, mean voltage refers to mean absolute voltage, because without applying an absolute value function, the mean value of a zero-centered sinusoid would be zero.

In various implementations, the reference signal may be a unit signal varying between −1 and 1. In various implementations, the angle may also vary between −1 and 1, corresponding to −$\pi$ and $\pi$ in radians. Although the period and frequency are simply inverses, they may both be provided to avoid having to later perform another computationally-intensive division to derive one from the other. The frequency may be used in determining average values over single cycles of the AC line. Instead of summing values and dividing by the period, the summed values can be multiplied by the frequency, which is mathematically equivalent but less computationally-intensive.

At startup, the PFC enable module 512 outputs the synchronized enable signal in an inactive state. After the PFC enable module 512 receives the enable request from the supervisor control module 270, the PFC enable module 512 waits for the reference data to indicate that the AC line is crossing zero. The PFC enable module 512 may then set the synchronized enable signal to an active state. In various implementations, the PFC enable module 512 may change the synchronized enable signal to the active state only at rising zero-crossings or only at falling zero-crossings.

When the synchronized enable signal transitions from the inactive state to the active state, the rate limiter module 508 may initially output the measured bus voltage as the desired bus voltage. Subsequently, the rate limiter module 508 may ramp the desired bus voltage up to the commanded bus voltage as limited by the saturation module 504. The slope of the ramp is determined by the rate limit imposed by the rate limiter module 508. Although described as applying a linear rate limit, the rate limiter module 508 may be implemented using any suitable alternative, such as a low-pass filter.

The PFC enable module 512 may receive information regarding operation of the motor control module 260 of FIG. 2. For example only, the motor control module 260 may provide an inverter operation signal to the PFC enable module 512. The PFC enable module 512 may set the synchronized enable signal to the inactive state when the inverter operation signal indicates that the inverter power module 208 is not operating. Under normal operation, the supervisor control module 270 sets the enable request to the inactive state when the inverter power module 208 is not operating. However, to protect against malfunctions of the supervisor control module 270, the PFC enable module 512 may itself monitor the inverter operation signal. Monitoring the inverter operation signal directly may allow for faster response to stopping of the inverter power module 208.

The PFC enable module 512 also outputs an immediate enable signal, which is received by a PWM drive module 530. When the immediate enable signal is in an active state, the PWM drive module 530 outputs PWM signals to switches of the PFC module 204 of FIG. 2. When the immediate enable signal is in an inactive state, the PWM drive module 530 halts outputting the PFC PWM signals. The immediate enable signal is set to the inactive state any time the synchronized enable signal is in the inactive state.

There may be times during which the synchronized enable signal is in the active state and the immediate enable signal is in the inactive state. This allows the PFC control module 250 to be disabled temporarily. For example only, the PFC enable module 512 may set the immediate enable signal to the inactive state when a requested PWM duty cycle is outside of an acceptable range. Additionally or alternatively, the PFC enable module 512 may set the immediate enable signal to the inactive state when a negative current demand is requested, as described below.

Further, the PFC enable module 512 may set the immediate enable signal to the inactive state when the reference signal from the reference generation module 520 differs too significantly from the AC signal. In each of these situations, the immediate enable signal may be set to the inactive state while the condition is present and reset to the active state once the condition is no longer present. The immediate enable signal may be set to the active state immediately after the condition ends or when one or more further conditions are satisfied, such as after a predetermined length of time or when more stringent error thresholds are met.

A voltage control module 540 receives the desired bus voltage from the rate limiter module 508 and receives the measured bus voltage. The voltage control module 540 executes an error control algorithm to minimize the difference between the desired bus voltage and the measured bus voltage. The voltage control module 540 generates a control value based on the error. The control value is used to determine a steady-state current demand. This steady-state current demand is converted into a sinusoidal current based on the reference signal. This instantaneous current is referred to as a non-offset desired instantaneous current.

A summing module 546 adds a DC correction factor from a DC offset module 550 to the non-offset desired instantaneous current to generate a desired instantaneous current. The DC offset module 550 receives a measured current value for each of the phases of the PFC module 204. Although a three-phase PFC module is described here for purposes of illustration only, the principles of the present disclosure apply to PFC modules having 1, 2, or more phases.

The DC offset module 550 averages the three phase currents together over one cycle (one period) of the AC signal to determine the amount of DC current being drawn from the AC signal. The DC offset module 550 generates the DC correction factor in order to reduce the calculated amount of DC current to zero. The DC offset module 550 may receive the synchronized enable signal, which resets operation of the DC offset module 550 as the PFC control module 250 is enabled.

A current control module 560 receives the desired instantaneous current from the summing module 546 and the first phase current. The current control module 560 executes an error control algorithm to minimize the difference between the first phase current and the desired instantaneous current.

The current through a given phase of the PFC module 204 may result from a voltage developed across the inductor corresponding to that phase. The current control module 560 therefore generates a desired instantaneous voltage in order to adjust the first phase current toward the desired instantaneous current. The current control module 560 may reset its error control algorithm when the immediate enable signal is in the inactive state or when the immediate enable signal transitions from the inactive state to the active state.

The desired instantaneous voltage is received by a duty cycle conversion module 570. The duty cycle conversion module 570 generates a PWM duty cycle that is calculated to produce the desired instantaneous voltage when applied to switches in the first phase of the PFC module 204. In various implementations, the duty cycle conversion module 570 may generate a different desired instantaneous duty cycle for each of the phases of the PFC module 204.

The relationship between the duty cycle applied to the switches and the voltage appearing across the corresponding inductor is established by the present DC bus voltage and the present voltage of the AC signal. Therefore, given the measured bus voltage and the present voltage of the AC signal, the duty cycle conversion module 570 can determine the desired instantaneous duty cycle that will produce the desired instantaneous voltage.

However, delays present in the PFC control module 250 may cause the desired instantaneous duty cycles to be incorrect. For example, by the time the desired instantaneous duty cycle is applied to the PFC module 204, the value of the AC signal may have changed. In addition, there may be a delay between the time the AC signal was measured and the time when the measured value is being processed. Filters, which may be added for control stability, may introduce additional delays.

To correct for these delays, the duty cycle conversion module 570 may generate the desired instantaneous duty cycles based not on the present value of the AC signal but based on predicted future values of the AC signal. A delay compensation module 580 may output predicted versions of the AC signal to the duty cycle conversion module 570.

The three phases of the PFC module 204 may be driven by PFC PWM signals that are 120 degrees out of phase with each other in a three-phase system. In a two-phase system, the two phases of the PFC module 204 may be driven by PFC PWM signals that are 180 degrees out of phase with each other. The delay from when a change in PWM duty cycle is requested until that change is reflected in the PFC PWM signals reaching the switches of the PFC module 204 may be different for each phase of the PFC module 204.

As a result, the delay compensation module 580 may provide different versions of the AC signal, each advanced by a slightly different amount that takes into account the phase difference between the PFC PWM signals. The delay compensation module 580 may predict future values of the AC signal based on the preset value of the AC signal and its present slope, or gradient.

Because the AC signal may be noisy, an instantaneous derivative may not provide an accurate prediction of a future value of the AC signal. In various implementations, a filter, such as a moving average or a low-pass filter, may be applied to the AC signal. In various other implementations, the derivative, or gradient, of the reference signal from the reference generation module 520 may be used as a more stable representation of the slope of the AC signal. Because the reference signal is phase locked to the AC signal, this should be an adequate estimation. Then, the delay compensation module 580 predicts a future value of the AC signal by extrapolating from the present value of the AC signal along the present slope of the reference signal.

A current balancing module 590 may reduce differences between the currents in the phases of the PFC module 204. One of the phases, called phase A, may be chosen as a reference phase. The remaining phases are then called subordinate phases. In a three-phase PFC module, the remaining two phases will be referred to as phase B and phase C.

The current balancing module 590 uses the current in phase A as a reference, and attempts to control the phase B and C currents to match the phase A current. The phase currents may be compared based on a statistical measure over a single cycle of the AC signal. For example, the statistical measure may be a peak value, a mean squared value, a root mean squared value, or a mean absolute value.

In order to adjust the currents of phases B and C, the current balancing module 590 provides an advance adjust signal to the delay compensation module 580 for each of phases B and C. The delay compensation module 580 receives these two advance adjust signals and adjusts the amount of advance of the AC signal provided for phases B and C, respectively.

Therefore, the current balancing module 590 can adjust the relative amounts of current in phases B and C by changing the amount of advance of the AC signal used by the duty cycle conversion module 570 to calculate the desired instantaneous duty cycles. The current balancing module 590 may attempt to achieve zero difference between measured currents of the three phases. When the synchronized enable signal transitions from the inactive state to the active state, the current balancing module 590 may reset the advance adjust signals.

The PWM drive module 530 receives the instantaneous duty cycles, each corresponding to one of the three phases, and generates complementary switch control signals for each phase. Therefore, for a system such as shown in FIG. 5 with three phases, six switch control signals will be generated.

Figure 6:
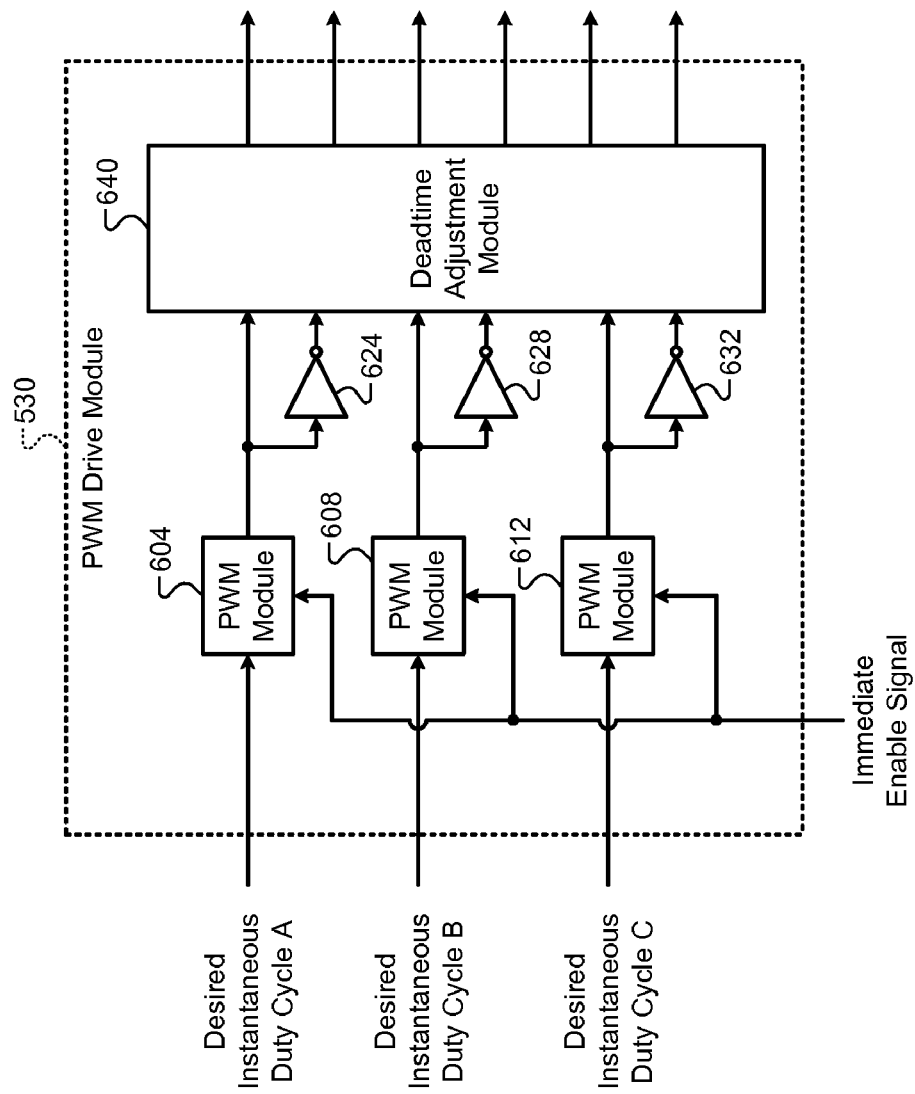
FIG. 6 is a functional block diagram of an example pulse-width modulation (PWM) drive module.

Referring now to FIG. 6, a functional block diagram of an example implementation of the PWM drive module 530 is shown. The PWM drive module 530 includes first, second, and third PWM modules 604, 608, and 612. The PWM modules 604, 608, and 612 receive the immediate enable signal and disable their outputs when the immediate enable signal is in the inactive state.

When the immediate enable signal is in the active state, the PWM modules 604, 608, and 612 output pulse-width-modulated signals having duty cycles specified by the desired instantaneous duty cycles A, B, and C, respectively. Because each phase of the PFC module 204 includes complementary switches, complementary versions of the outputs of the PWM modules 604, 608, and 612 are generated by inverters 624, 628, and 632, respectively.

If the complementary switches in a given PFC phase were controlled with strictly complementary control signals, there may be some overlap between one switch turning off and the other switch turning on. When both switches are on, an undesirable short circuit current may flow. Therefore, a deadtime adjustment module 640 offsets the switching-on time of one signal from the switching-off time of the other control signal.

For example only, the deadtime adjustment module 640 may slightly advance an off-going (active to inactive) control signal and slightly delay an on-coming (inactive to active) control signal. In this way, any overlap between the conducting times of the complementary switches is avoided. Outputs of the deadtime adjustment module 640 are provided to the switches of the PFC module 204.

Figure 7:
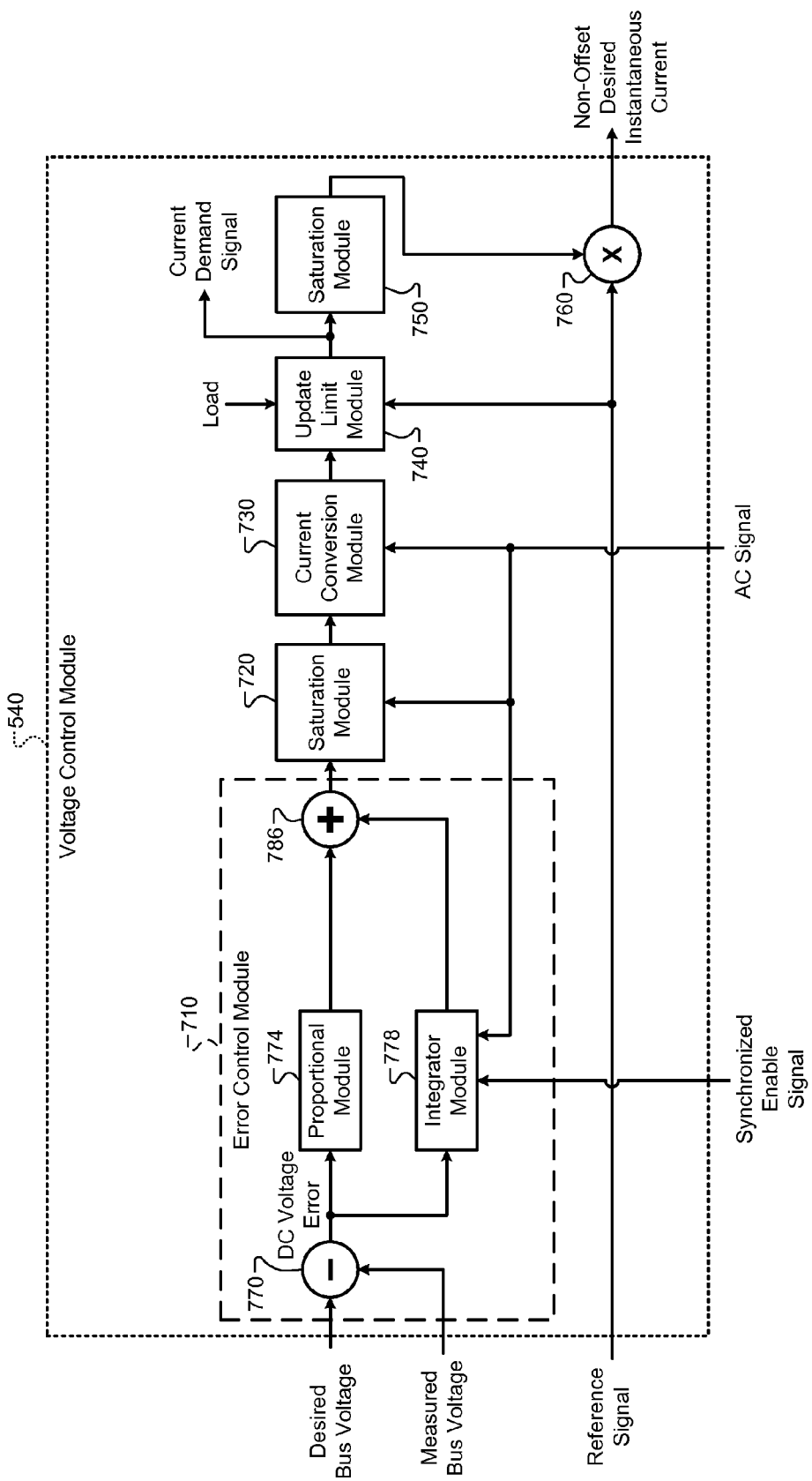
FIG. 7 is a functional block diagram of an example voltage control module.

Referring now to FIG. 7, a functional block diagram of an example implementation of the voltage control module 540 is shown. The voltage control module 540 includes an error control module 710 that receives the desired bus voltage from the rate limiter module 508 and the measured bus voltage.

The error control module 710 generates a control value calculated to minimize the difference between the desired bus voltage and the measured bus voltage. The control value may be adjusted by a saturation module 720. An output of the saturation module 720 is received by a current conversion module 730, which converts the control value into a current demand.

To linearize the current demand, the current conversion module 730 may divide the control value by a measured parameter of the AC signal. For example only, the measured parameter may be a mean of the absolute value of the AC signal or a root mean squared value of the AC signal. Therefore, as the measured parameter increases, the current demand decreases. As a result, the current conversion module 730 automatically applies an appropriate correction corresponding to the need for increased current when the AC signal is smaller.

An update limit module 740 may restrict changes in the current demand from the current conversion module 730 to coincide with reference points of the AC signal. For example, the update limit module 740 may restrict changes in the current demand to occur only at a rising zero-crossing or a falling zero-crossing of the AC signal—i.e., once per cycle. By restricting the update rate to once per cycle, the PFC control module 250 controls the PFC module 204 uniformly across each AC cycle. Uniform control throughout an AC cycle tends to cause symmetric power draw from the positive and negative portions of the AC line, thereby avoiding current and power imbalance. A current or power imbalance may result in DC current being drawn from the AC line.

In various implementations, the update limit module 740 may restrict changes in the current demand to occur at either zero-crossing of the AC signal—i.e., once per half cycle. As a further alternative, the update limit module 740 may restrict changes in the current demand to other increments of the AC signal, such as once per quarter cycle. For example only, the update limit module 740 may operate at a more restrictive update rate, such as once per cycle, and then adapt to a faster update rate, such as once per quarter cycle. This adaptation may be performed based on load. For example only, large changes in load may cause the update limit module 740 to increase the update rate.

In various implementations, the load may be calculated based on values received from the motor control module 260 of FIG. 2, or the value of the load itself may be received directly from the motor control module 260. For example only, the load may be inferred from changes in the DC bus voltage—a rapid change in DC bus voltage may be the result of a large change in load. A faster update rate allows the PFC control module 250 to quickly respond to large changes in load, which may be more important than avoiding drawing imbalanced DC current from the AC line. Once the large change has passed, the update limit module 740 may decrease the update rate.

In various implementations, the update limit module 740 may be omitted, or may be replaced or supplemented with a filter, such as a low-pass filter. The update limit module 740 may use the reference signal from the reference generation module 520 to determine when each cycle or half-cycle of the AC signal occurs.

An output of the update limit module 740 is called a current demand signal. The current demand signal may be negative, which indicates that more current than is necessary to maintain the desired bus voltage is being provided by the PFC module 204. Because a negative current demand can not be effectuated, the continuing presence of a negative current demand will result in the DC bus voltage rising and may eventually cause an over-voltage trip condition.

The negative current demand is received by a saturation module 750, which may enforce a lower limit of 0. However, this does not correct the underlying problem signified by the negative current demand—i.e., too much current being provided by the PFC module 204. Therefore, the PFC enable module 512 may set the immediate enable signal to the inactive state when the current demand signal is zero or negative. This stops the PFC module 204 from continuing to provide excess current.

A multiplication module 760 multiplies an output of the saturation module 750 by the reference signal to create an instantaneous current. Because the reference signal is sinusoidal, the output of the multiplication module 760 is also sinusoidal. Because an offset will later be applied, the output of the multiplication module 760 is referred to as a non-offset desired instantaneous current.

Returning to the error control module 710, a subtraction module 770 subtracts the measured bus voltage from the desired bus voltage to determine a DC voltage error. A proportional module 774 multiplies the DC voltage error by a proportional constant. An integrator module 778 combines the DC voltage error with a previous output of the integrator module 778. The integrator module 778 may first multiply the DC voltage error by an integral constant. The integrator module 778 may apply upper and/or lower limits to its output. In various implementations, the limits applied by the integrator module 778 and the saturation module 720 may vary based on a value of the AC signal, such as a mean absolute value.

The integrator module 778 may reset its output to zero when the synchronized enable signal transitions to the inactive state or transitions back to the active state. In various implementations, the integrator module 778 may also reset its output to zero when the immediate enable signal transitions to the inactive state or transitions back to the active state. In various implementations, the proportional constant and/or the integrator constant may be set to zero to remove the corresponding contribution of the proportional module 774 or the integrator module 778.

A summing module 786 adds an output of the proportional module 774 to the output of the integrator module 778. The sum from the summing module 786 is output from the error control module 710 as the control value. Although the error control module 710 is shown for purposes of illustration as a proportional-integral controller, error control modules in the present disclosure (including the error control module 710) can be implemented in various other forms, such as using a non-linear controller. For example only, an error control module may include a feed-forward component, which may be summed with a feedback component to generate a control value.

Figure 8:
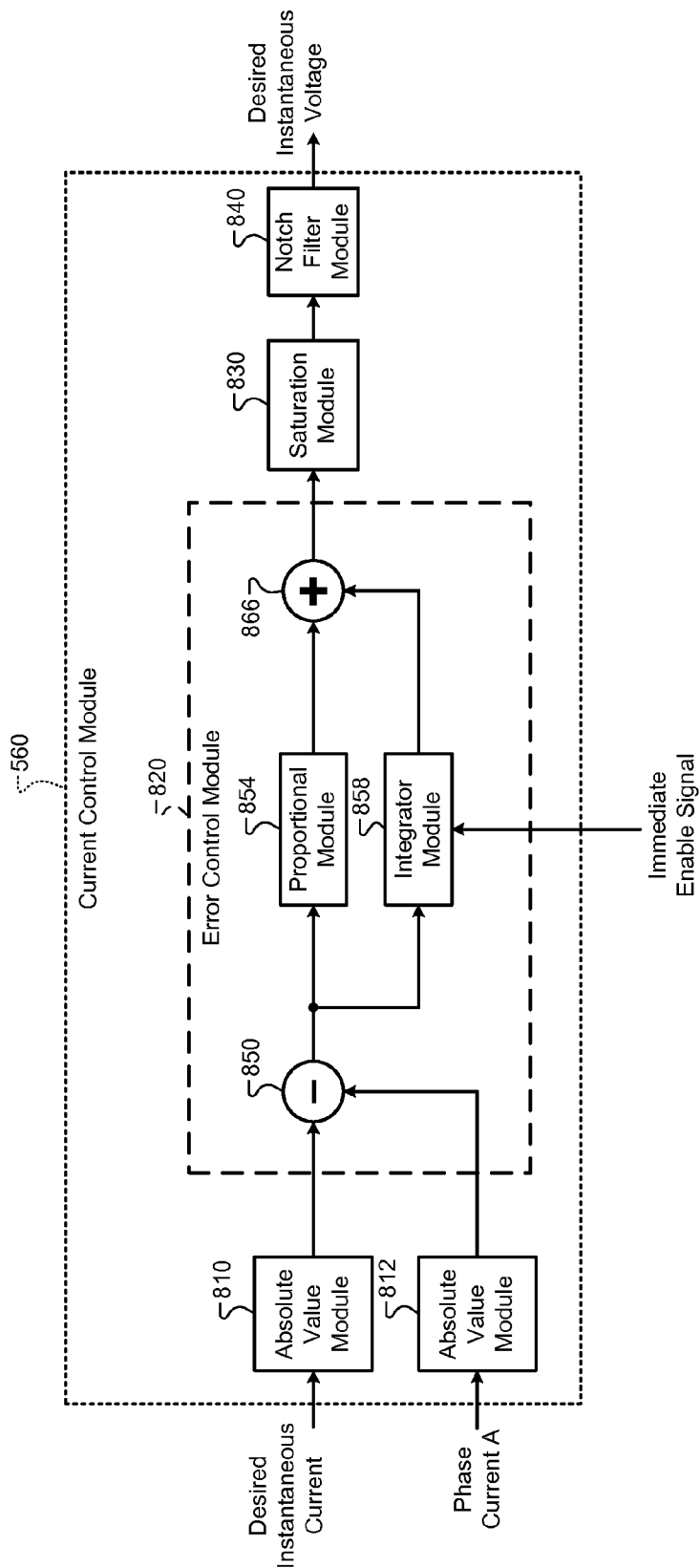
FIG. 8 is a functional block diagram of an example current control module.

Referring now to FIG. 8, a functional block diagram of an example implementation of the current control module 560 is shown. The current control module 560 includes first and second absolute value modules 810 and 812. The first absolute value module 810 receives the desired instantaneous current from the summing module 546 of FIG. 5 and outputs its absolute value. The second absolute value module 812 receives the current of one of the PFC phases and outputs its absolute value. In three-phase PFC systems, as illustrated here, the current of phase A may be used, while in two-phase PFC systems, the current of phase B may be used.

An error control module 820 outputs a voltage value calculated to minimize the error between the absolute values of the desired instantaneous current and the phase A current. The voltage value is processed by a saturation module 830, and then by a notch filter module 840, which applies a notch filter to the output of the saturation module 830 to generate the desired instantaneous voltage. The notch filter module 840 may reduce oscillations that are created by delayed feedback through the control system. For example only, the notch filter module 840 may be implemented similarly to a notch filter module described below with respect to FIG. 10.

The error control module 820 includes a subtraction module 850, a proportional module 854, an integrator module 858, and a summing module 866, which may operate similarly to the subtraction module 770, the proportional module 774, the integrator module 778, and the summing module 786 of FIG. 7. The sum from the summing module 866 is output from the error control module 820 as the voltage value. The integrator module 858 may reset its output to zero when the immediate enable signal transitions to the inactive state or transitions back to the active state. In various implementations, the integrator module 858 may also reset its output to zero when the synchronized enable signal transitions to the inactive state or transitions back to the active state.

Figure 9:
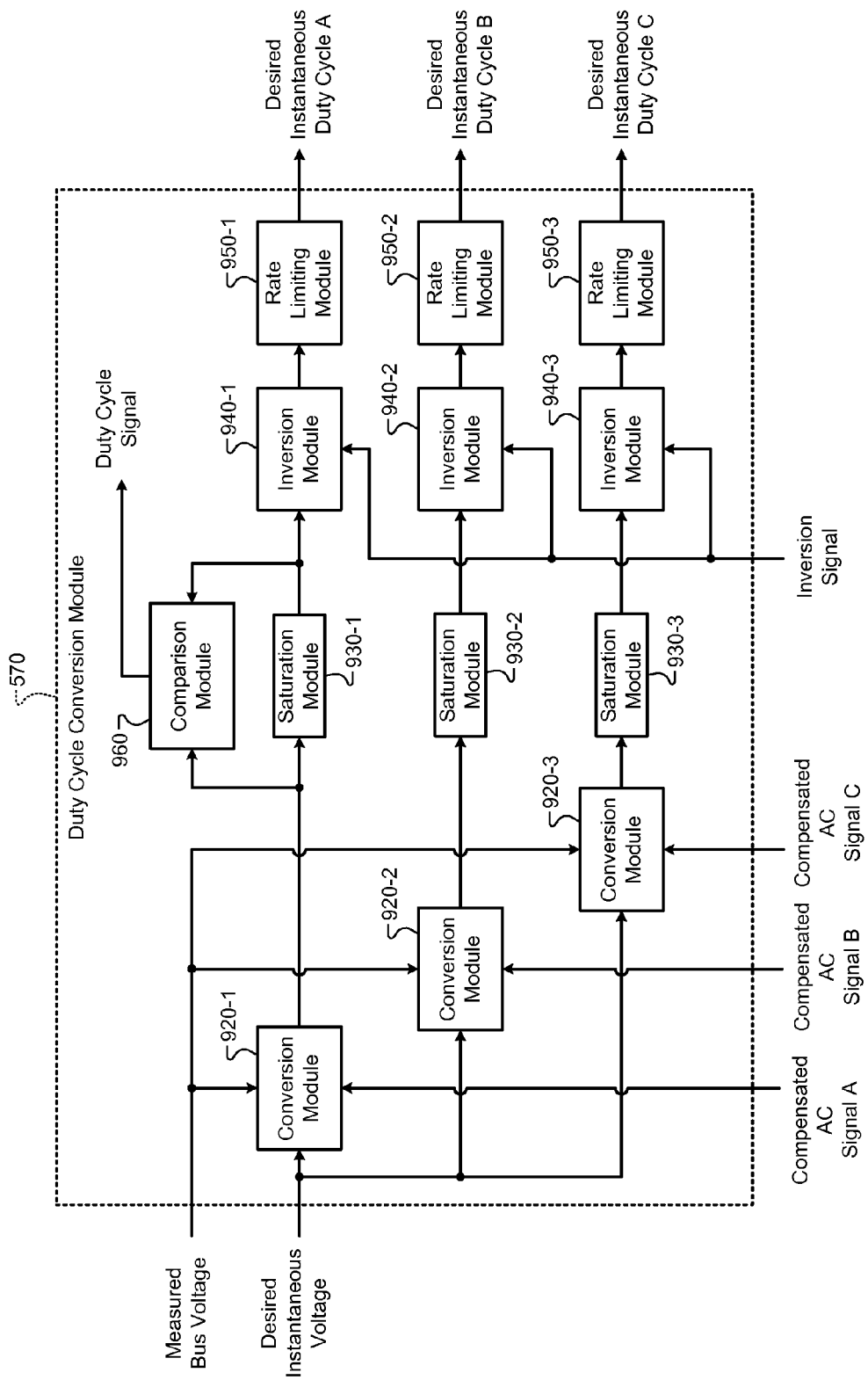
FIG. 9 is a functional block diagram of an example duty cycle conversion module.

Referring now to FIG. 9, a functional block diagram of an example implementation of the duty cycle conversion module 570 is shown. First, second, and third conversion modules 920-1, 920-2, and 920-3 (collectively, conversion modules 920) receive the desired instantaneous voltage from the current control module 560 also receive the measured bus voltage. In addition, the conversion modules 920 receive compensated AC signals A, B, and C, respectively, from the delay compensation module 580.

Each of the compensated AC signals corresponds to a different one of the phases of the PFC module 204. Each of the conversion modules 920 outputs a duty cycle based on the desired instantaneous voltage. However, because the compensated AC signals A, B, and C may be shifted in time by the delay compensation module 580, the duty cycle values may differ.

The conversion modules 920 may each calculate a duty cycle based on the expression: $(V_{desired}-(|V_{AC}|-V_{DC}))/V_{DC}$. In this expression, $V_{desired}$ is the desired instantaneous voltage, $V_{AC}$ is the value of the compensated AC signal, and $V_{DC}$ is the measured bus voltage. When the variation in $V_{cc}$ is an order of magnitude less than that of $V_{AC}$, the benefit of predicting future values of $V_{DC}$ may be negligible. Therefore, in various implementations, while $V_{AC}$ is a predicted compensated value, $V_{DC}$ is simply the present measured bus voltage.

Outputs of the conversion modules 920 are received by saturation modules 930-1, 930-2, and 930-3 (collectively, saturation modules 930), respectively. The saturation modules 930 may enforce a lower limit on duty cycle in order to ensure that accurate current readings can be made. For example, see FIG. 3a, where a low duty cycle may result in the shunt resistor 380 having insufficient current to generate accurate current readings.

When the duty cycle applied to a lower switch (adjacent to a current sensing resistor) is too low, measuring current through the current sensing resistor may not be sufficiently accurate. For example, current through a given one of the PFC legs may be measurable when current flows through the lower switch of the given PFC leg for at least a minimum period of time. This minimum period of time corresponds to the minimum duty cycle. For example only, the minimum duty cycle may be approximately 5%. In addition, the saturation modules 930 may apply a corresponding upper limit, such as 95%.

Inversion modules 940-1, 940-2, and 940-3 (collectively, inversion modules 940) receive outputs from the saturation modules 930, respectively. Because the PFC switches are operating in a complementary fashion, when a lower switch of an inverter leg is operating, for example, at a 20% duty cycle, the upper switch in that same leg is operating at an 80% duty cycle. When the AC line crosses zero, however, current from the AC line begins flowing in the opposite direction, and the roles of the top and bottom switches are reversed. Once the AC line crosses zero, the lower switch is still operating at a duty cycle of 20%, but is effectively acting as the upper switch. Meanwhile, the upper switch is still operating at a duty cycle of 80%, but is effectively acting as the lower switch. As a result, the effective duty cycle of the PFC leg switches from 80% to 20% when the AC line crosses zero.

To counteract this reversal, the inversion modules 940 either begin inverting or stop inverting the duty cycles at each zero-crossing of the AC line. However, inverting a duty cycle is a large discontinuous change. If the change does not coincide with the actual zero-crossing, large current fluctuations may be induced. Because identifying the time of the zero-crossing may be difficult, the large discontinuous step in duty cycle that would otherwise result from inversion may instead be implemented as a ramp. The ramp prevents making a large discontinuous step at the wrong time and spreads the error around the estimated time of the zero-crossing.

In various implementations, rate limiting modules 950-1, 950-2, and 950-3 (collectively, rate limiting modules 950) apply the ramp (e.g., a rate limit) to outputs of the inversion modules 940, respectively. Outputs of the rate limiting modules 950 are the desired instantaneous duty cycles A, B, and C, respectively, which are provided to the PWM drive module 530.

If the inversion modules 940 inverted exactly at the estimated zero-crossing, the rate limiting modules 950 would ramp the duty cycle signals to their new values solely after the zero-crossing. Instead, performing half of the ramp prior to the zero-crossing, leaving only half of the ramp after the zero-crossing, distributes the error more symmetrically on the AC line. In addition, starting the ramp early decreases the error that would otherwise occur if the AC line crossed zero before the predicted zero-crossing time.

The inversion modules 940 perform the inversion based on an inversion signal from the delay compensation module 580. In various implementations, the delay compensation module 580 reverses a polarity of the inversion signal at the time of each instructed inversion. In other words, when the inversion signal switches to a first state, the inversion modules 940 begin inverting, and when the inversion signal switches to a second state, the inversion modules 940 stop inverting. To begin the ramp early, the delay compensation module 580 advances the timing of the inversion signal relative to the estimated occurrence of the zero-crossing.

For example only, if a rate-limited inversion of duty cycle from one extreme to the other is performed over 4 PWM periods, the polarity of the inversion signal may be reversed 2 PWM periods before the estimated time of the zero-crossing. This time of 2 PWM periods is called an inversion advance. In various implementations, when the rate limit applied by the rate limiting modules 950 is decreased, the amount of inversion advance provided by the inversion signal is also increased. As described in more detail below, systematic control delays in the PFC control module 250 may be accounted for by the delay compensation module 580, which may increase the inversion advance to offset control delays.

A comparison module 960 may monitor the input and the output of the saturation module 930-1. When the duty cycle at the output of the saturation module 930-1 is greater than the duty cycle at the input of the saturation module 930-1, the comparison module 960 recognizes that a lower limit on the duty cycle has been applied by the saturation module 930-1.

An output of the comparison module 960 may be provided to the PFC enable module 512 to indicate that a low duty cycle request has been detected. When a low duty cycle request is detected, the PFC enable module 512 may set the immediate enable signal to be inactive. This disables the PFC module 204 and allows the DC bus to decrease until a minimum duty cycle (such as 5%) is present. In various implementations, the comparison module 960 may simply compare the input of the saturation module 930-1 with a predetermined limit, which may be equal to the lower limit of the saturation module 930-1.

Figure 10:
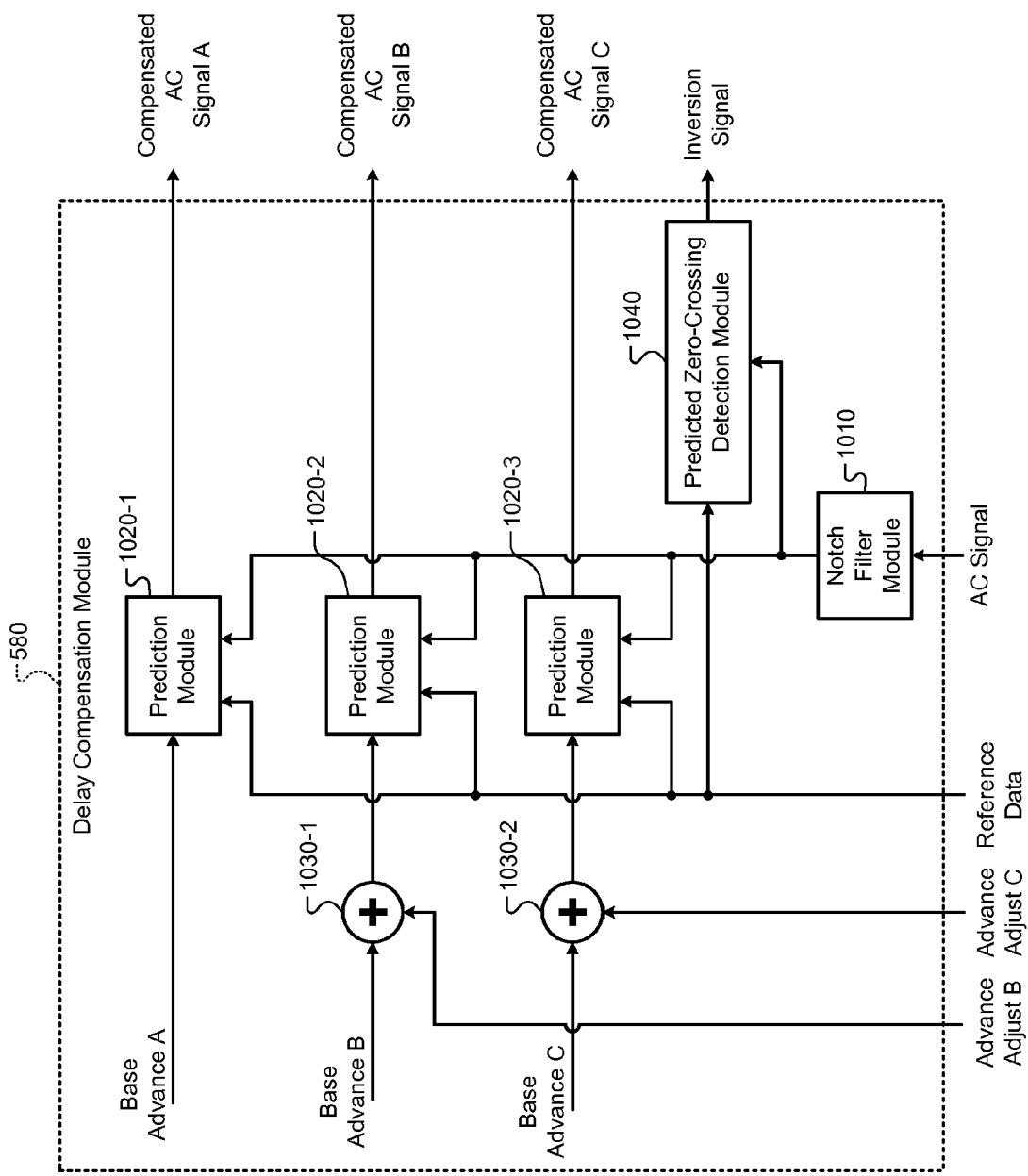
FIG. 10 is a functional block diagram of an example delay compensation module.

Referring now to FIG. 10, a functional block diagram of an example implementation of the delay compensation module 580 is shown. The delay compensation module 580 includes a notch filter module 1010 that applies a notch filter to the AC signal. For example only, control loop delay may lead to closed-loop oscillation in the control values. The term control loop delay may refer to a delay attributable to a time between when an increase (e.g., in current) is requested and when the increase is observed in a measured current value.

In addition, changes in current demand may result in variations in the AC line. A current oscillation then creates an AC voltage oscillation, which feeds back to the current oscillation. In an example where the control loop delay is 2 PWM periods, the period of oscillation may be twice the control delay, or 4 PWM periods. If the PWM switching frequency is, for example only, 20 kHz, the oscillation frequency would then be one quarter of the PWM switching frequency, or 5 kHz.

The notch filter module 1010 may be centered at the oscillation frequency to minimize the oscillation. In one example implementation, the notch filter module 1010 generates an output by adding the present input value of the notch filter module 1010 to the input value from 2 PWM periods in the past and dividing the sum by two. In other words, the notch filter may be implemented as the average of the present reading of the AC signal and the reading of the AC signal from 2 PWM periods prior.

Prediction modules 1020-1, 1020-2, and 1020-3 (collectively, prediction modules 1020) receive the filtered AC signal from the notch filter module 1010. The prediction modules 1020 predict future values of the filtered AC signal based on the reference data. For example, the reference gradient may be used. As described above, the reference gradient is the derivative of the sinusoidal reference signal, which is phase locked to the AC signal. The reference gradient therefore provides a noiseless estimation of the rate of change of the AC signal. In various implementations, the reference gradient is scaled to the peak voltage of the AC signal.

How far into the future each of the prediction modules 1020 predict the filtered AC signal is determined by a corresponding advance input. The prediction module 1020-1 receives a base advance corresponding to phase A. For example, the base advance may be determined at design time and stored in non-volatile memory. In various implementations, the amount of advance may be expressed in units of PWM periods or in units of time, such as seconds or microseconds. Base advances may be predefined for the prediction modules 1020-2 and 1020-3 as well. For example only, the base advances for the prediction modules 1020-1, 1020-2, and 1020-3 may be 3.17 PWM periods, 3.08 PWM periods, and 3.25 PWM periods, respectively.

Based on input from the current balancing module 590, the base advances for phases B and C may be adjusted. For example, summing modules 1030-1 and 1030-2 add advance adjust B and advance adjust C from the current balancing module 590 to base advance B and base advance C, respectively. Outputs of the summing modules 1030-1 and 1030-2 are used as the advance input for phases B and C by the prediction modules 1020-2 and 1020-3, respectively.

In various implementations, the prediction modules 1020 may calculate the compensated AC signal by adding the filtered AC signal value to a product of the reference gradient and the specified advance. In other words, the prediction modules 1020 use a linear extrapolation of the filtered AC signal based on the slope (gradient) of the reference signal. Outputs of the prediction modules 1020 are provided to the duty cycle conversion module 570 as the compensated AC signals A, B, and C, respectively.

A predicted zero-crossing detection module 1040 predicts when a zero-crossing of the AC signal will occur. The predicted zero-crossing detection module 1040 may use the filtered AC signal from the notch filter module 1010, as shown, or may use the raw AC signal. The predicted zero-crossing detection module 1040 may predict ahead by an amount equal to the control delay plus half of the time required for inversion of a duty cycle using a given rate limit. For example only, when the control delay is 3 PWM periods and the rate limit causes the inversion to take 4 PWM periods, the zero-crossing may be predicted ahead by 5 PWM periods.

Once the predicted zero-crossing detection module 1040 predicts that the AC signal will cross zero, the predicted zero-crossing detection module 1040 reverses the polarity of the inversion signal. This instructs the duty cycle conversion module 570 to either begin or stop inverting the desired duty cycles. For example only, the predicted zero-crossing detection module 1040 may output the inversion signal having a first state until a predicted zero-crossing is reached, at which point the inversion signal is output having a second state. The inversion signal is switched back to the first state when the subsequent predicted zero-crossing is reached. For example only, the first state of the inversion signal may correspond to negative values of the AC signal, while the second state of the inversion signal may correspond to positive values of the AC signal.

Figure 11:
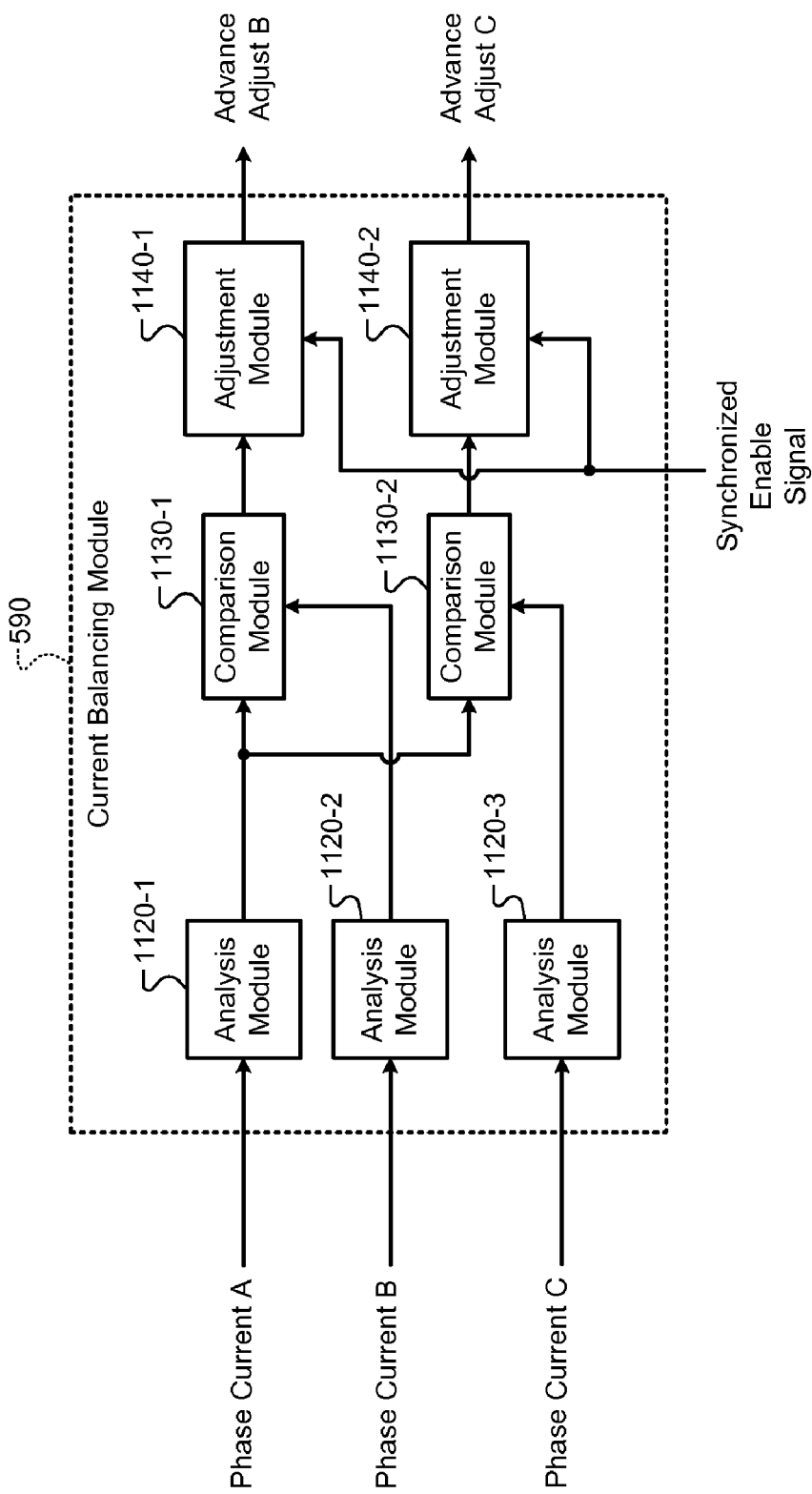
FIG. 11 is a functional block diagram of an example current balancing module.

Referring now to FIG. 11, a functional block diagram of an example implementation of the current balancing module 590 is shown. The current balancing module 590 includes analysis modules 1120-1, 1120-2, and 1120-3 (collectively, analysis modules 1120). The analysis modules 1120 analyze one or more parameters of the phase currents of the PFC module 204, respectively. For example only, the analysis modules 1120 may calculate a value of the respective phase currents over a full cycle of the AC line. The value may be, for example, a root mean squared, a mean squared, a mean absolute value, or a peak.

The analysis modules 1120 may use the reference data from the reference generation module 520 to determine when each cycle of the AC line begins and ends. Comparison modules 1130-1 and 1130-2 (collectively, comparison modules 1130) compare the phase A current to the phase B and C currents, respectively. In various implementations, the comparison modules 1130-1 and 1130-2 attempt to minimize the difference between the phase B and C currents, respectively, and the phase A current.

If one or more phases are carrying higher currents, the losses in those phases will be disproportionately higher. This reduces efficiency of the PFC module 204 and may result in excessive heating in the phases carrying higher currents. Differences in currents may result from manufacturing variations, such as variations in the inductor. For example only, as inductance of an inductor decreases, the current that the inductor carries increases and results in increases in resistive heat loss.

In the example of FIG. 11, the phase A current is the reference current. Comparison modules 1130 indicate to adjustment modules 1140-1 and 1140-2 (collectively, adjustment modules 1140) whether the phase B and C currents are greater than or less than the phase A current, respectively. The advance adjustments for phases B and C are selectively varied to match the phase B and C currents to the phase A current.

In various implementations, the adjustment modules 1140 increase their output by one increment for each line cycle in which the respective subordinate phase current is greater than the phase A current. Similarly, the adjustment modules 1140 decrease their output by one increment for each line cycle in which the respective subordinate phase current is less than the phase A current For example only, the adjustment module 1140-1 may increase advance adjust B by 1/1000 of a PWM period for each AC line cycle in which phase current B is greater than phase current A. Similarly, the adjustment module 1140-1 may decrease advance adjust B by 1/1000 of a PWM period for each AC line cycle in which phase current B is less than phase current A.

The predetermined increments when increasing and decreasing the advance adjust signals may be equal or may be different. If the analysis modules 1120 only output new values after each AC line cycle, the adjustment modules 1140 may also update the advance adjust signals only once per AC line cycle. The adjustment modules 1140 receive the synchronized enable signal from the PFC enable module 512. When the synchronized enable signal is in the inactive state, the adjustment modules 1140 may reset the advance adjust signals B and C, respectively. For example only, the adjustment modules 1140 may reset the advance adjust signals B and C to zero.

Typical PFC systems may control a duty cycle of switching elements (e.g., transistors) based on measurements from an alternating current (AC) line signal. The measurements from the AC line signal, however, are made in real time and thus the duty cycle is controlled based on past measurements. In other words, there is an inherent delay in controlling the duty cycle based on measurements from the AC line signal. Furthermore, the AC line signal is susceptible to AC line drops and/or noise and thus measurements of the AC line signal may be incorrect. More specifically, controlling the duty cycle based on incorrect measurements may lead to errors such as trips and/or faults.

Therefore, a system and method is presented that predicts ahead a first predetermined number of cycles along the AC line signal, thus compensating for the inherent delay. More specifically, the system and method filter the AC line signal using a notch filter to remove harmonic distortion (i.e., ripples). The filtered AC line signal may be referred to hereinafter as the AC line signal.

The system and method then predict ahead the first predetermined number of cycles along the AC line signal by extrapolation using a gradient (i.e., slope) of a reference signal. For example only, the first predetermined number of cycles may be three. In one embodiment, the reference signal may be a mathematical sinusoid (i.e., a sine wave) in phase with the AC line signal. The system and method may then control the duty cycle based on the prediction.

The system and method may predict ahead a second predetermined number of cycles along the AC line signal also by extrapolation using the gradient of the reference signal. The system and method may generate a inversion signal based on the predicted AC line signal. For example, the inversion signal may be the sign of the advanced (i.e., predicted ahead) AC line signal. In other words, when the predicted AC line signal is a positive value (greater than zero), the inversion signal may be a first state (e.g., a "1"), and when the prediction of the AC line signal is a negative value (less than zero), the inversion signal may be a second state (e.g., a "0").

Figure 12:
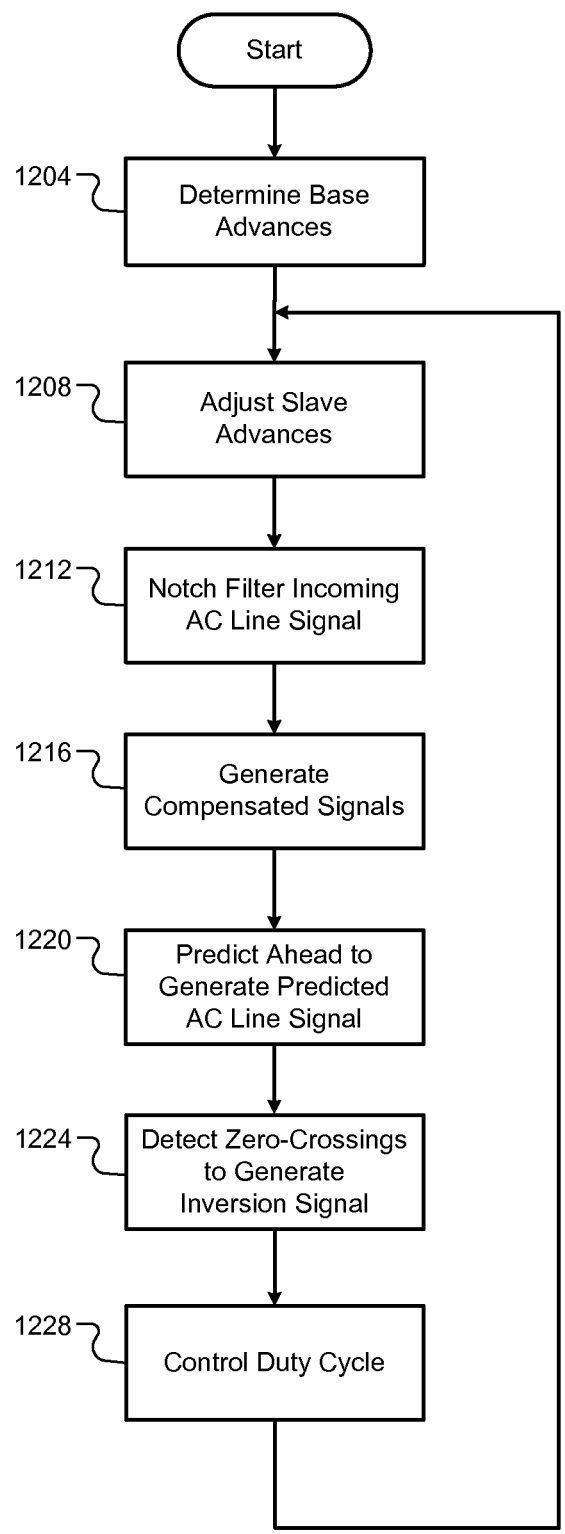
FIG. 12 is a flow diagram of an example method for compensating for delay.

Referring now to FIG. 12, a method for compensating for delay begins at 1204. At 1204, the delay compensation module 580 determines the base advances. For example, the delay compensation module 580 may retrieve predetermined base advance values from memory. Additionally, the delay compensation module 580 may determine various quantities of base advances. For example, the delay compensation module 580 may determine one base advance (A, such as in single phase operation), two base advances (A and B, such as in two-phase operation), or three base advances (A, B, and C, such as in three-phase operation). The delay compensation module 580, however, may also determine other numbers of base advances.

For example only, in three-phase operation the delay compensation module 580 may retrieve the following values from memory: base advance A may be 3.18, base advance B may be 3.07, and base advance C may be 3.25. Additionally, for example only, in two-phase operation the delay compensation module 580 may retrieve the following values from memory: base advance A may be 2.5 and base advance B may be 2.5.

Similarly, for example only, in single phase operation the delay compensation module 580 may retrieve from memory a base advance A of 2.5.

At 1208, the delay compensation module 580 adjusts slave advances. Specifically, the slave advances refer to base advances being adjusted with respect to a reference advance. For example only, in three-phase operation base advances B and C may be adjusted by advance adjustments B and C, respectively. In other words, base advances B and C represent the slave advances and base advance A represents the reference advance. Alternatively, for example only, in two-phase operation base advance A may be adjusted by advance adjustment A. In other words, base advance A represents the slave advance and base advance B represents the reference advance.

At 1212, the delay compensation module 580 notch filters the incoming AC line signal. More specifically, the delay compensation module 580 may filter the AC line signal to remove instability in the AC line signal corresponding to a corner frequency.

At 1216, the delay compensation module 580 generates compensated AC signals. More specifically, the delay compensation module 580 may generate the compensated AC signals based on the notch-filtered AC line signal, the adjusted advance(s), and the reference advance. For example only, the delay compensation module 580 may generate three compensated AC signals (A, B, C) based on the reference advance A and the adjusted advances B and C, respectively, and notch-filtered AC line signal.

At 1220, the delay compensation module 580 may generate a predicted AC line signal. More specifically, the delay compensation module 580 may predict ahead along the AC line signal based on a gradient of a reference signal. For example, the reference signal may be the generated reference signal as previously described herein. In other words, the delay compensation module 580 may predict ahead by approximating a future value of the AC ling signal using a slope of the generated reference signal.

At 1224, the delay compensation module 580 generates the inversion signal based on the predicted AC line signal. More specifically, the delay compensation module 580 generates the inversion signal when the predicated AC line signal indicates a zero-crossing. For example, the inversion signal may be based on the sign of the predicted AC line signal. Specifically, the inversion signal may be used to invert polarities of the duty cycles.

At 1228, the duty cycle conversion module 570 may control the duty cycle based on the compensated AC signals and the inversion signal. For example only, in three-phase operation the duty cycle conversion module 570 may control the duty cycle based on three compensated AC signals A, B, and C. Alternatively, the duty cycle conversion module 570 may control the duty cycle based on the reference signal and the inversion signal. In other words, using the reference signal instead of the compensated AC signals may decrease errors due to AC line drops and/or noise. Control may then return to 1208.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A power factor correction (PFC) system, comprising:
an adjustment module that generates N time advances based on N predetermined time advances and (N−1) time advance adjustments, wherein N is an integer greater than zero;
a compensation module that generates N compensated versions of an input alternating current (AC) line signal by predicting ahead of the input AC line signal using a gradient of a sinusoidal reference signal and the N time advances, respectively, wherein the sinusoidal reference signal is synchronized with the input AC line signal in phase and frequency; and
a duty cycle control module that generates PFC duty cycles based on the N compensated versions of the input AC line signal.

2. The PFC system of claim 1, further comprising:
a predicted zero-crossing detection module that generates an inversion signal based on predicted zero-crossings of the input AC line signal,
wherein the predicted zero-crossing detection module predicts the zero-crossings based on the input AC line signal,
wherein the PFC duty cycles are inverted based on the inversion signal.

3. The PFC system of claim 2, wherein:
full inversion of the PFC duty cycles occurs over a first length of time,
the predicted zero-crossing detection module switches a state of the inversion signal based on a predicted zero-crossing of an advanced version of the input AC line signal,
the predicted zero-crossing detection module generates the advanced version of the input AC line signal by predicting ahead by a time advance, and
the time advance is based on a sum of a control system delay of the PFC system and half of the first length of time.

4. The PFC system of claim 3, wherein the predicted zero-crossing detection module generates the advanced version of the input AC line signal by extrapolating a present value of the input AC line signal by the time advance along a present gradient of the sinusoidal reference signal.

5. The PFC system of claim 2, further comprising:
a notch filter that generates a filtered AC signal by filtering out a predetermined frequency of the input AC line signal, wherein the predetermined frequency is based on a control system delay of the PFC system, wherein the compensation module generates the N compensated versions of the input AC line signal by predicting ahead of the filtered AC signal, and wherein the predicted zero-crossing detection module predicts the zero-crossings based on the filtered AC signal.

6. The PFC system of claim 1, further comprising:
a notch filter that generates a filtered AC signal by filtering out a predetermined frequency of the input AC line signal, wherein the predetermined frequency is based on a control system delay of the PFC system, and wherein the compensation module generates the N compensated versions of the input AC line signal by predicting ahead of the filtered AC signal.

7. The PFC system of claim 1, wherein for each version of the N compensated versions of the input AC line signal, the compensation module generates the version by extrapolating a present value of the input AC line signal by a corresponding one of the N time advances along a present gradient of the sinusoidal reference signal.

8. The PFC system of claim 1, wherein the (N−1) time advance adjustments are based on differences between N measured currents having different phases, wherein N is an integer greater than one.

9. The PFC system of claim 1, wherein the N predetermined time advances are set at design time.

10. A method for power factor correction (PFC), comprising:
generating N time advances based on N predetermined time advances and (N−1) time advance adjustments, wherein N is an integer greater than zero;
generating N compensated versions of an input alternating current (AC) line signal by predicting ahead of the input AC line signal using a gradient of a sinusoidal reference signal and the N time advances, respectively, wherein the sinusoidal reference signal is synchronized with the input AC line signal in phase and frequency; and
generating PFC duty cycles based on the N compensated versions of the input AC line signal.

11. The method of claim 10, further comprising:
generating an inversion signal based on predicted zero-crossings of the input AC line signal;
predicting the zero-crossings based on the input AC line signal; and
inverting the PFC duty cycles based on the inversion signal.

12. The method of claim 11, wherein:
full inversion of the PFC duty cycles occurs over a first length of time;
switching a state of the inversion signal based on a predicted zero-crossing of an advanced version of the input AC line signal; and
generating the advanced version of the input AC line signal by predicting ahead by a time advance, wherein the time advance is based on a sum of a control system delay of a PFC system and half of the first length of time.

13. The method of claim 12, further comprising generating the advanced version of the input AC line signal by extrapolating a present value of the input AC line signal by the time advance along a present gradient of the sinusoidal reference signal.

14. The method of claim 11, further comprising:
generating a filtered AC signal by filtering out a predetermined frequency of the input AC line signal using a notch filter, wherein the predetermined frequency is based on a control system delay of a PFC system.

15. The method of claim 14, further comprising:
generating the N compensated versions of the input AC line signal by predicting ahead of the filtered AC signal; and
predicting the zero-crossings based on the filtered AC signal.

16. The method of claim 10, further comprising:
generates a filtered AC signal by filtering out a predetermined frequency of the input AC line signal using a notch filter, wherein the predetermined frequency is based on a control system delay of a PFC system; and
generating the N compensated versions of the input AC line signal by predicting ahead of the filtered AC signal.

17. The method of claim 10, further comprising for each version of the N compensated versions of the input AC line signal, generating the version by extrapolating a present value of the input AC line signal by a corresponding one of the N time advances along a present gradient of the sinusoidal reference signal.

18. The method of claim 10, wherein the (N−1) time advance adjustments are based on differences between N measured currents having different phases, wherein N is an integer greater than one.

19. The method of claim 10, wherein the N predetermined time advances are set at design time.

20. A method for power factor correction (PFC), comprising:
receiving an input alternating current (AC) line signal;
generating a filtered AC signal by filtering out a predetermined frequency of the input AC line signal using a notch filter, wherein the predetermined frequency is based on a control system delay of a PFC system;
generating a sinusoidal reference signal that is synchronized with the input AC line signal in phase and frequency;
generating N time advances based on N predetermined time advances and (N−1) time advance adjustments, wherein N is an integer greater than zero;
for each of N compensated versions of the input AC line signal, generating the version by extrapolating a present value of the filtered AC line signal by a corresponding one of the N time advances along a present gradient of the sinusoidal reference signal;
generating PFC duty cycles based on the N compensated versions of the input AC line signal;
predicting zero-crossings based on the filtered AC line signal;
generating an inversion signal based on predicted zero-crossings of the filtered AC line signal;
inverting the PFC duty cycles based on the inversion signal;
generating an advanced version of the filtered AC line signal by predicting ahead by a time advance that includes a sum of a control system delay of a PFC system and half of a time for full inversion of the PFC duty cycles; and
switching a state of the inversion signal based on a predicted zero-crossing of the advanced version of the filtered AC line signal.

* * * * *

UNITED STATES PATENT AND TRADEMARK OFFICE
CERTIFICATE OF CORRECTION

PATENT NO. : 8,406,021 B2
APPLICATION NO. : 12/852578
DATED : March 26, 2013
INVENTOR(S) : Charles E. Green Page 1 of 1

It is certified that error appears in the above-identified patent and that said Letters Patent is hereby corrected as shown below:

Title Page, Column 2,

Other Publications, Line 1 — Delete "J.E.," and insert --J. E.,--.

Title Page 2, Column 2,

Other Publications, Line 19 — Delete "Seach" and insert --Search--.

In the Specifications:

Column 10, Line 56 — Delete "388" and insert --386--.

Column 10, Line 56 — Delete "389" and insert --385--.

Column 13, Line 40 — Delete "or," and insert --or--.

Column 20, Line 15 — Delete "$V_{cc}$" and insert --$V_{DC}$--.

Column 21, Line 4 — Before "inverted", insert --are--.

Column 23, Line 55 — After "current", insert --.--.

In the Claims:

Column 27, Line 52 — In Claim 16, Delete "generates" and insert --generating--.

Signed and Sealed this
Third Day of September, 2013

Teresa Stanek Rea
*Acting Director of the United States Patent and Trademark Office*